US007496638B2

(12) United States Patent
Philyaw

(10) Patent No.: US 7,496,638 B2
(45) Date of Patent: *Feb. 24, 2009

(54) LAUNCHING A WEB SITE USING A PORTABLE SCANNER

(75) Inventor: Jeffry Jovan Philyaw, Dallas, TX (US)

(73) Assignee: RPX-LV Acquisition LLC, Wilmington, DE (US)

( * ) Notice: Subject to any disclaimer, the term of this patent is extended or adjusted under 35 U.S.C. 154(b) by 746 days.

This patent is subject to a terminal disclaimer.

(21) Appl. No.: 11/093,886

(22) Filed: Mar. 29, 2005

(65) Prior Publication Data

US 2005/0193125 A1    Sep. 1, 2005

Related U.S. Application Data

(63) Continuation of application No. 09/615,686, filed on Jun. 21, 2000, now Pat. No. 6,877,032, which is a continuation-in-part of application No. 09/580,848, filed on May 30, 2000, now Pat. No. 6,860,424, which is a continuation-in-part of application No. 09/378,221, filed on Aug. 19, 1999, now Pat. No. 6,745,234, which is a continuation-in-part of application No. 09/151,471, filed on Sep. 11, 1998, now abandoned, and a continuation-in-part of application No. 09/151,530, filed on Sep. 11, 1998, now Pat. No. 6,098,106.

(51) Int. Cl.
*G06F 15/16* (2006.01)
*G06F 13/42* (2006.01)
*G02B 26/10* (2006.01)
*H04M 9/00* (2006.01)

(52) U.S. Cl. .................. 709/217; 709/228; 340/825; 349/457; 235/462.25

(58) Field of Classification Search ................. 709/217, 709/228
See application file for complete search history.

(56) References Cited

U.S. PATENT DOCUMENTS 3,668,312 A    6/1972    Yamamoto et al.

(Continued)

FOREIGN PATENT DOCUMENTS

EP    0 961 250 A2    12/1999

(Continued)

OTHER PUBLICATIONS

"Group Decision Support System; Development and Application", Energy Systems, James W. Thomas; Westinghouse, Pittsburgh, PA.

(Continued)

*Primary Examiner*—William C Vaughn, Jr.
*Assistant Examiner*—Muktesh G Gupta
(74) *Attorney, Agent, or Firm*—Howison & Arnott, L.L.P.

(57) ABSTRACT

A method for a user to access information on a network. Information from a machine recognizable code (MRC) (1606) is extracted at a user location, which MRC (1606) has associated therewith routing information to a remote location (312) on the network. The extracted information from the MRC (1606) is wirelessly transmitted to a network interface device (302) in response to the information being extracted. The remote location (312) associated with the extracted information from the MRC (1606) is then connected thereto from the user location and the information downloaded therefrom. The downloaded information is displayed on a display (1612) at the user location, such that when displayed, substantially immediate feedback is provided to the user in response to the MRC (1606) being scanned.

18 Claims, 18 Drawing Sheets

U.S. PATENT DOCUMENTS

| | | |
|---|---|---|
| 4,002,886 A | 1/1977 | Sundelin |
| 4,042,792 A | 8/1977 | Pakenham et al. |
| 4,365,148 A | 12/1982 | Whitney |
| 4,621,259 A | 11/1986 | Schepers et al. |
| 4,654,482 A | 3/1987 | DeAngelis |
| 4,780,599 A | 10/1988 | Baus |
| 4,785,296 A | 11/1988 | Tabata et al. |
| 4,816,904 A | 3/1989 | McKenna et al. |
| 4,817,136 A | 3/1989 | Rhoads |
| 4,833,308 A | 5/1989 | Humble |
| 4,841,132 A | 6/1989 | Kajitani et al. |
| 4,845,634 A | 7/1989 | Vitek et al. |
| 4,850,009 A * | 7/1989 | Zook et al. ............... 379/93.17 |
| 4,894,789 A | 1/1990 | Yee |
| 4,899,370 A | 2/1990 | Kameo et al. |
| 4,901,073 A | 2/1990 | Kibrick |
| 4,905,094 A | 2/1990 | Pocock et al. |
| 4,907,264 A | 3/1990 | Seiler et al. |
| 4,916,293 A | 4/1990 | Cartlidge et al. |
| 4,937,853 A | 6/1990 | Brule et al. |
| 4,947,028 A | 8/1990 | Gorog |
| 4,959,530 A | 9/1990 | O'Connor |
| 4,975,948 A | 12/1990 | Andersen et al. |
| 4,984,155 A | 1/1991 | Geier et al. |
| 5,038,023 A | 8/1991 | Saliga |
| 5,054,096 A | 10/1991 | Beizer |
| 5,088,045 A | 2/1992 | Shimanaka et al. |
| 5,111,391 A | 5/1992 | Fields et al. |
| 5,115,326 A | 5/1992 | Burgess et al. |
| 5,128,752 A | 7/1992 | Von Kohorn |
| 5,144,654 A | 9/1992 | Kelley et al. |
| 5,161,037 A | 11/1992 | Saito |
| 5,161,214 A | 11/1992 | Addink et al. |
| 5,182,705 A | 1/1993 | Barr et al. |
| 5,189,630 A | 2/1993 | Barstow et al. |
| 5,191,525 A | 3/1993 | LeBrun et al. |
| 5,198,644 A | 3/1993 | Pfeiffer et al. |
| 5,235,654 A | 8/1993 | Anderson et al. |
| 5,241,402 A | 8/1993 | Aboujaoude et al. |
| 5,243,531 A | 9/1993 | DiPippo et al. |
| 5,247,347 A | 9/1993 | Litteral et al. |
| 5,262,860 A | 11/1993 | Fitzpatrick et al. |
| 5,285,278 A | 2/1994 | Holman |
| 5,287,181 A | 2/1994 | Holman |
| 5,288,976 A | 2/1994 | Citron et al. |
| 5,296,688 A | 3/1994 | Hamilton et al. |
| 5,304,786 A | 4/1994 | Pavlidis et al. |
| 5,305,195 A | 4/1994 | Murphy |
| 5,319,454 A | 6/1994 | Schtte |
| 5,324,922 A | 6/1994 | Roberts |
| 5,331,547 A | 7/1994 | Laszlo |
| 5,340,966 A | 8/1994 | Morimoto |
| 5,357,276 A | 10/1994 | Banker et al. |
| 5,362,948 A | 11/1994 | Morimoto |
| 5,382,779 A | 1/1995 | Gupta |
| 5,386,298 A | 1/1995 | Bronnenberg et al. |
| 5,398,336 A | 3/1995 | Tantry et al. |
| 5,405,232 A | 4/1995 | Lloyd et al. |
| 5,418,713 A | 5/1995 | Allen |
| 5,420,403 A | 5/1995 | Allum et al. |
| 5,420,943 A | 5/1995 | Mak |
| 5,424,524 A | 6/1995 | Ruppert et al. |
| 5,438,355 A | 8/1995 | Palmer |
| 5,446,490 A | 8/1995 | Blahut et al. |
| 5,446,919 A | 8/1995 | Wilkins |
| 5,491,508 A | 2/1996 | Friedell et al. |
| 5,493,107 A | 2/1996 | Gupta et al. |
| 5,519,878 A | 5/1996 | Dolin, Jr. |
| 5,530,852 A | 6/1996 | Meske, Jr. et al. |
| 5,570,295 A | 10/1996 | Isenberg et al. |
| 5,572,643 A | 11/1996 | Judson |
| 5,592,551 A | 1/1997 | Lett et al. |
| 5,594,226 A | 1/1997 | Steger |
| 5,602,377 A | 2/1997 | Beller et al. |
| 5,602,380 A | 2/1997 | Bishay |
| 5,604,542 A | 2/1997 | Dedrick |
| 5,640,193 A | 6/1997 | Wellner |
| 5,649,186 A | 7/1997 | Ferguson |
| 5,664,110 A | 9/1997 | Green et al. |
| 5,671,282 A | 9/1997 | Wolff et al. |
| 5,675,721 A | 10/1997 | Freedman et al. |
| 5,682,540 A | 10/1997 | Klotz, Jr. et al. |
| 5,694,163 A | 12/1997 | Harrison |
| 5,708,780 A | 1/1998 | Levergood et al. |
| 5,710,887 A | 1/1998 | Chelliah et al. |
| 5,715,314 A | 2/1998 | Payne et al. |
| 5,724,424 A | 3/1998 | Gifford |
| 5,745,681 A | 4/1998 | Levine et al. |
| 5,754,906 A | 5/1998 | Yoshida |
| 5,757,917 A | 5/1998 | Rose et al. |
| 5,761,606 A | 6/1998 | Wolzien |
| 5,764,906 A | 6/1998 | Edelstein et al. |
| 5,765,176 A | 6/1998 | Bloomberg |
| 5,768,528 A | 6/1998 | Stumm |
| 5,774,664 A | 6/1998 | Hidary et al. |
| 5,774,870 A | 6/1998 | Storey |
| 5,778,367 A | 7/1998 | Wesinger, Jr. et al. |
| 5,790,793 A | 8/1998 | Highley |
| 5,791,991 A | 8/1998 | Small |
| 5,794,210 A | 8/1998 | Goldhaber et al. |
| 5,796,952 A | 8/1998 | Davis et al. |
| 5,804,803 A | 9/1998 | Cragun et al. |
| 5,812,776 A | 9/1998 | Gifford |
| 5,815,776 A | 9/1998 | Nukada |
| 5,832,223 A | 11/1998 | Hara et al. |
| 5,833,468 A | 11/1998 | Guy et al. |
| 5,848,202 A | 12/1998 | D'Eri et al. |
| 5,848,413 A | 12/1998 | Wolff |
| 5,854,897 A | 12/1998 | Radziewicz et al. |
| 5,864,823 A | 1/1999 | Levitan |
| 5,869,819 A | 2/1999 | Knowles et al. |
| 5,905,248 A | 5/1999 | Russell et al. |
| 5,905,251 A | 5/1999 | Knowles |
| 5,905,665 A | 5/1999 | Rim |
| 5,905,865 A | 5/1999 | Palmer et al. |
| 5,907,793 A | 5/1999 | Reams |
| 5,913,210 A | 6/1999 | Call |
| 5,915,090 A | 6/1999 | Joseph et al. |
| 5,918,214 A | 6/1999 | Perkowski |
| 5,925,865 A | 7/1999 | Steger |
| 5,929,425 A | 7/1999 | Kanno |
| 5,929,850 A | 7/1999 | Broadwin et al. |
| 5,932,863 A | 8/1999 | Rathus et al. |
| 5,933,829 A | 8/1999 | Durst et al. |
| 5,948,061 A | 9/1999 | Merriman et al. |
| 5,957,695 A | 9/1999 | Redford et al. |
| 5,960,411 A | 9/1999 | Hartman et al. |
| 5,961,603 A | 10/1999 | Kunkel et al. |
| 5,970,471 A | 10/1999 | Hill |
| 5,970,472 A | 10/1999 | Allsop et al. |
| 5,971,277 A | 10/1999 | Cragun et al. |
| 5,974,443 A | 10/1999 | Jeske |
| 5,974,451 A | 10/1999 | Simmons |
| 5,976,833 A | 11/1999 | Furukawa et al. |
| 5,978,773 A | 11/1999 | Hudetz et al. |
| 5,991,739 A | 11/1999 | Cupps et al. |
| 5,992,752 A | 11/1999 | Wilz, Sr. et al. |
| 5,995,105 A | 11/1999 | Reber et al. |
| 6,002,394 A | 12/1999 | Schein et al. |
| 6,002,946 A * | 12/1999 | Reber et al. .................. 455/557 |
| 6,003,073 A | 12/1999 | Solvason |
| 6,006,257 A | 12/1999 | Slezak |
| 6,009,410 A | 12/1999 | LeMole et al. |
| 6,009,465 A | 12/1999 | Decker et al. |

| | | | |
|---|---|---|---|
| 6,012,102 A | 1/2000 | Shachar | |
| 6,018,764 A | 1/2000 | Field et al. | |
| 6,064,979 A | 5/2000 | Perkowski | |
| 6,098,106 A | 8/2000 | Philyaw et al. | |
| 6,108,656 A | 8/2000 | Durst et al. | |
| 6,199,048 B1 * | 3/2001 | Hudetz et al. | 705/23 |
| 6,356,949 B1 * | 3/2002 | Katsandres et al. | 709/238 |
| 6,745,234 B1 | 6/2004 | Philyaw et al. | |
| 6,754,698 B1 | 6/2004 | Philyaw et al. | |
| 6,758,398 B1 | 7/2004 | Philyaw et al. | |
| 6,836,799 B1 | 12/2004 | Philyaw et al. | |
| 6,837,436 B2 * | 1/2005 | Swartz et al. | 235/472.02 |
| 6,877,032 B1 * | 4/2005 | Philyaw | 709/217 |
| 2001/0024189 A1 * | 9/2001 | Michie | 345/156 |

FOREIGN PATENT DOCUMENTS

| | | |
|---|---|---|
| JP | 10188140 A | 12/1996 |
| WO | WO 95/10813 | 10/1994 |
| WO | WO 96/07146 | 9/1995 |
| WO | WO 97/37319 | 2/1997 |
| WO | WO 98/09243 | 8/1997 |
| WO | WO 98/03923 | 1/1998 |
| WO | WO 98/06055 | 2/1998 |
| WO | WO 98/19259 | 5/1998 |
| WO | WO 98/40823 | 9/1998 |
| WO | WO 99/63457 | 6/1999 |

OTHER PUBLICATIONS

"New Technologies in Credit Card Authentication", Pieter de Bruyne; Institute for Communications TechnologyZurich, Switzerland; CH2892-1990 IEEE.

"Avital, a Private Teaching System by Fax Communication", Atsushi Iizawa et al.; Software Research Center, RICOH Company; 8186-2697; Jun. 1992; IEEE.

"Document on Computer" IPCC96; Fast Track; The US Postal Service . . . ; 7803-3689, 1996, IEEE.

"Development of a Commercially Successful Wearable Data Collection System" Robert Stein et al.; 8186-9074; Jul. 1998, IEEE.

"Nestle, What Do Forward Looking Companies Consider in Their Plans and Developments?" A. G. Johnston; File Name: IEE Colloquium; Oct. 12, 1997.

"The Automation Synergy", Ricardo Neves et al.; IEEE Catalog No. 97TH8280.

"Integration of Hand-Written Address Interpretation Technology Into the United States Postal Service Remote Computer Reader System"; Sargur N. Srihari et al. 8186-7898; Apr. 1997; IEEE.

"Paper Based Document Security—A Review" Rudolf L. Van Renesse; European Conference on Security and Detection Apr. 28-30, 1997; Publication No. 437; IEE 1997.

"IEEE Standard for Bar Coding for Distribution Transformers"; IEEE Std. C57, 1996; Copyright 1996 by the Institute of Electrical and Electronics Engineers, Inc.

"The Stylus" Shopping from Home; John W. Barrus et al.; Stylus Innovation, Cambridge, MA 02142; 8186-2730; IEEE, 1992.

"Distributing Uniform Resource Locators as Bar Code Images"; IBM Technical Disclosure Bullettin . . . , Jan. 1996; vol. 39; Pub. No. 1; pp. 167-168.

"Bar Code Method for Automating Catalog Orders"; IBM Technical Disclosure Bulletin, pp. 243-244; Sep. 1988.

"Bar Code Recognition System Using Image Processing"; Miko Kuroki et al.; Hitachi Process Computer Engineering, Inc.

* cited by examiner

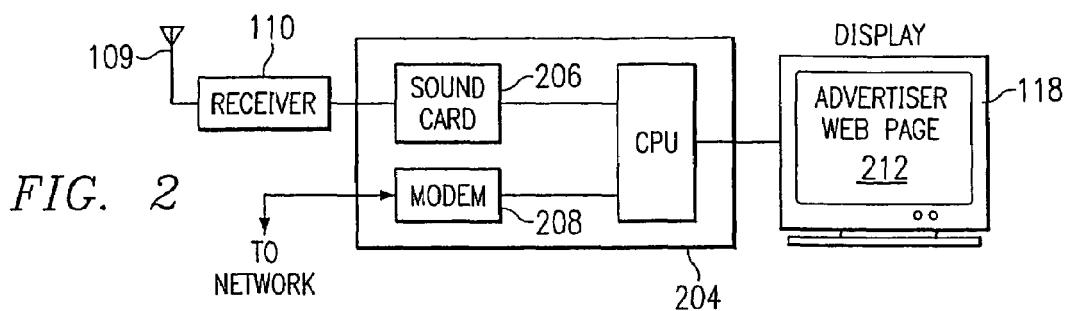

FIG. 2

PATH A: SOURCE TO ARS

| URL OF ARS | ADVERTISER PRODUCT CODE | URL OF SOURCE |
|---|---|---|

PATH B: ARS TO SOURCE

| URL OF SOURCE | URL OF ADVERTISER | URL OF ARS |
|---|---|---|

PATH C: SOURCE TO ADVERTISER

| URL OF ADVERTISER | REQUEST-FOR-INFORMATION | URL OF SOURCE |
|---|---|---|

PATH D: ADVERTISER TO SOURCE

| URL OF SOURCE | REQUESTED INFORMATION | URL OF ADVERTISER |
|---|---|---|

PATH E: ARS TO ADVERTISER (OPTIONAL)

| URL OF ADVERTISER | REQUEST-FOR-INFORMATION | URL OF SOURCE |
|---|---|---|

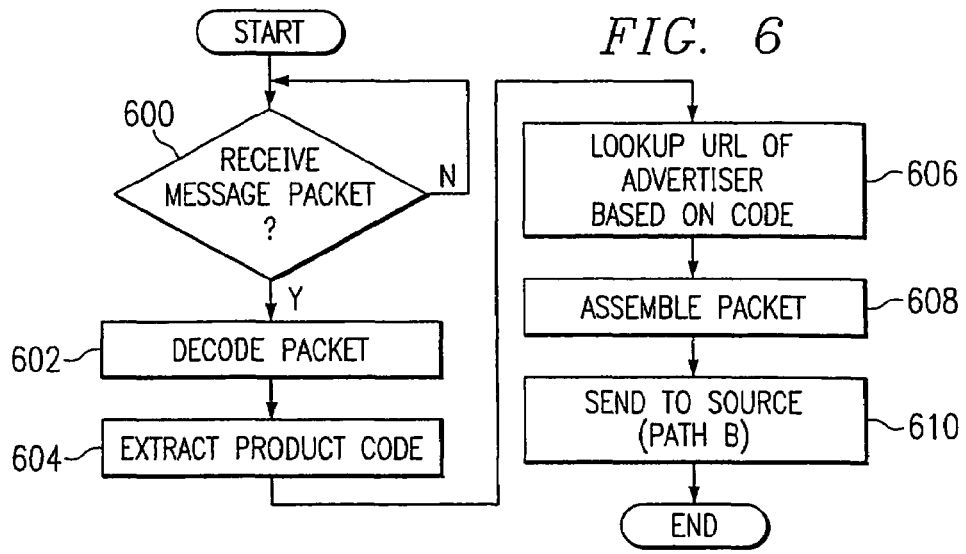
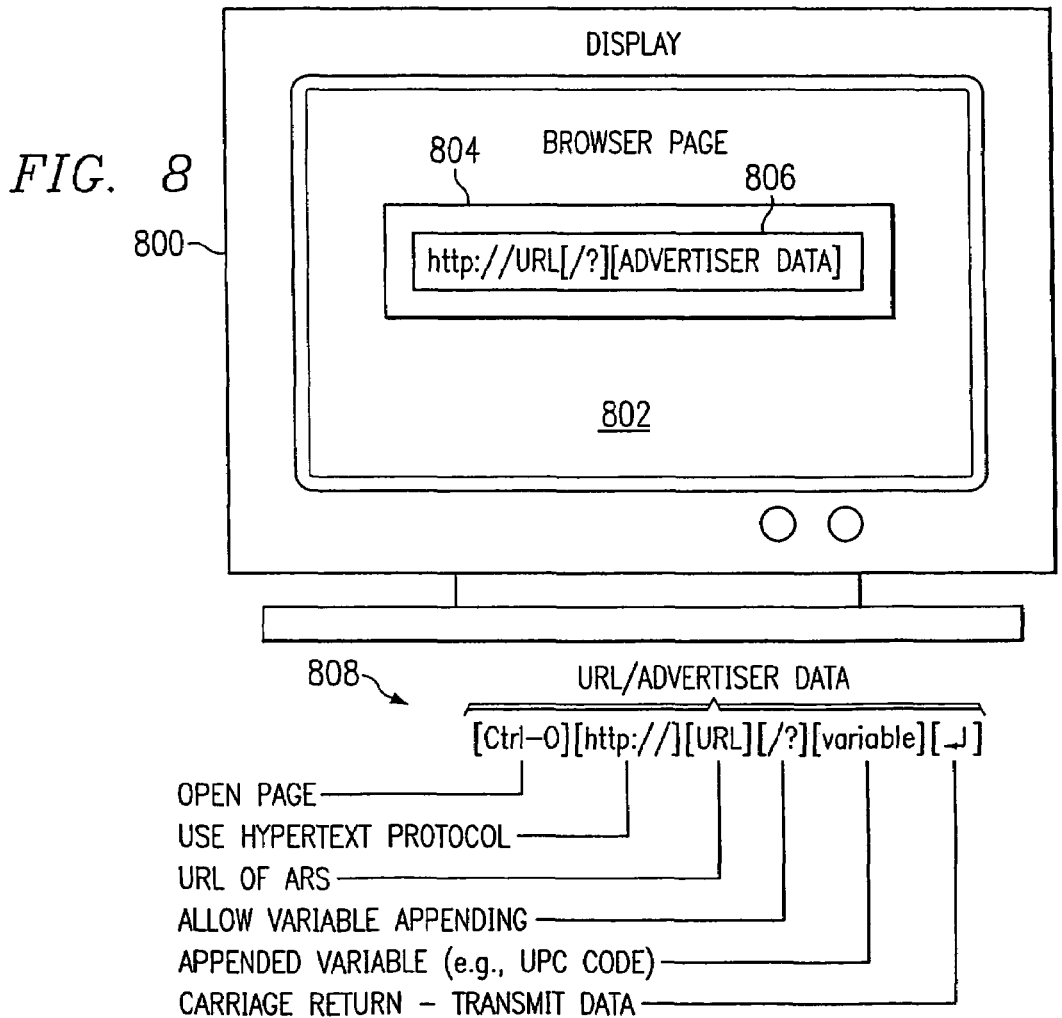

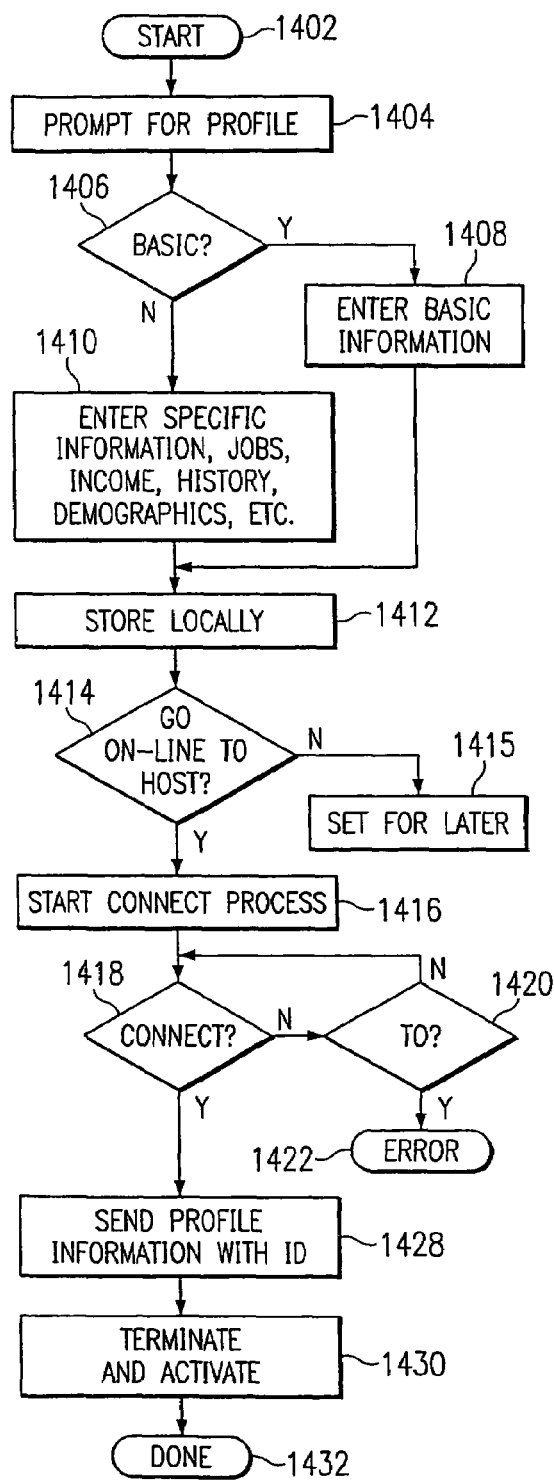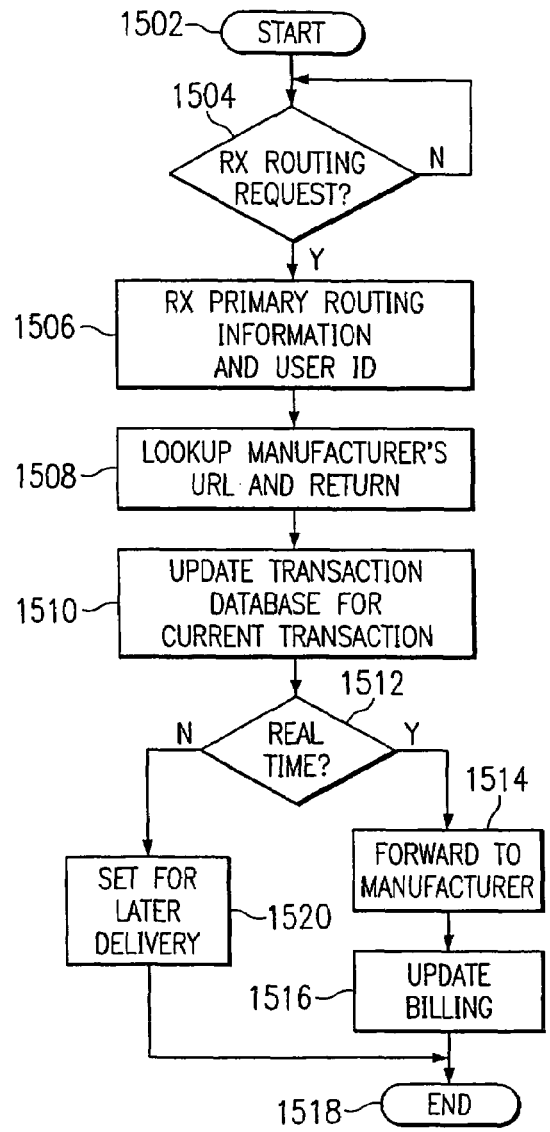

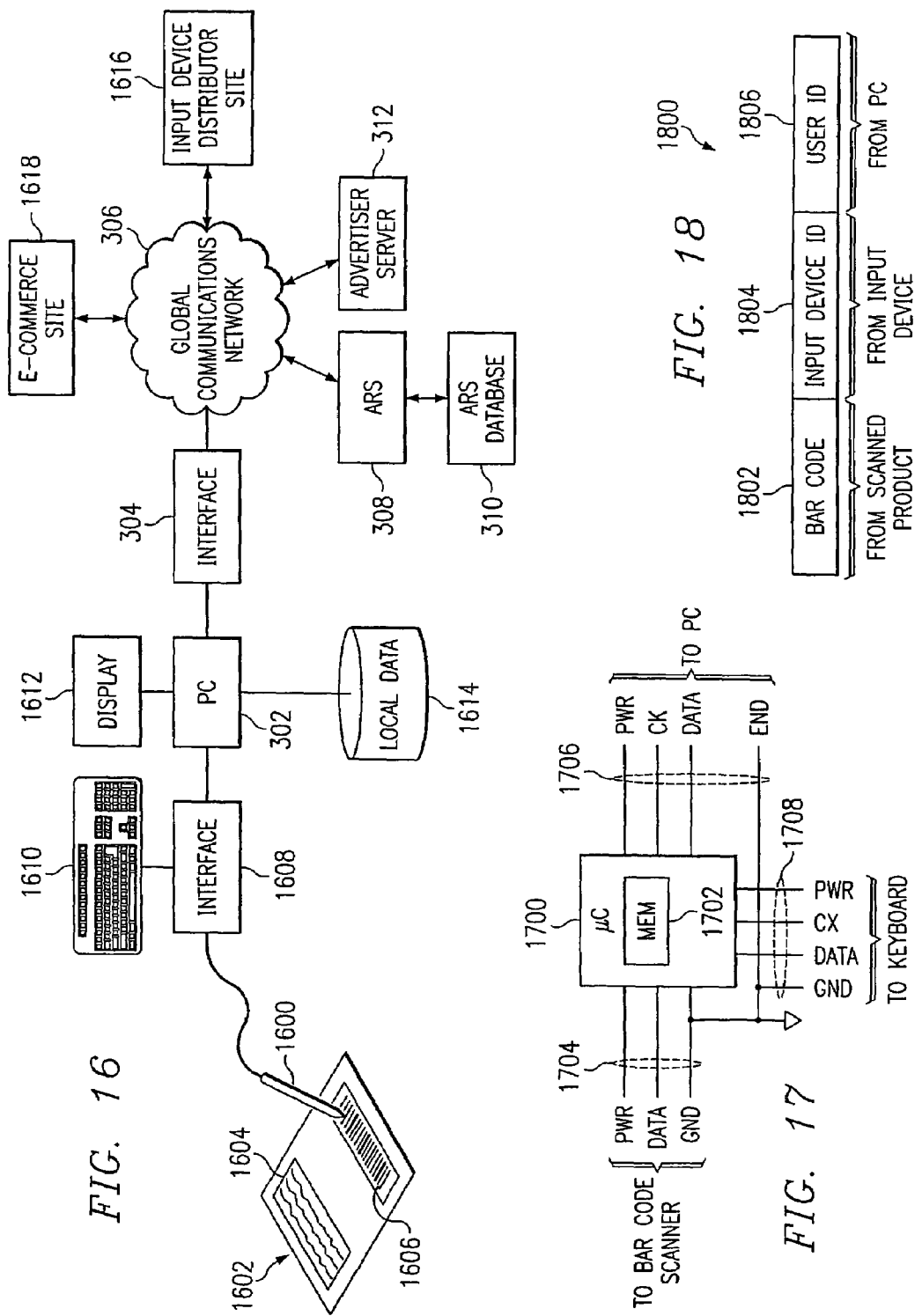

FIG. 41
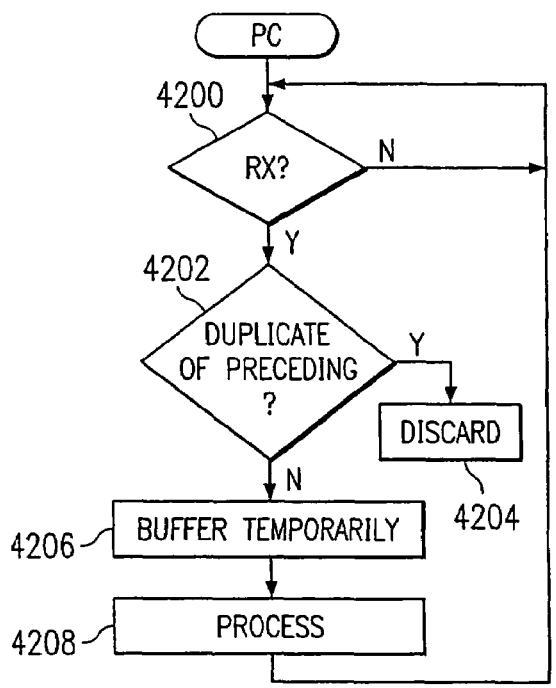
FIG. 42
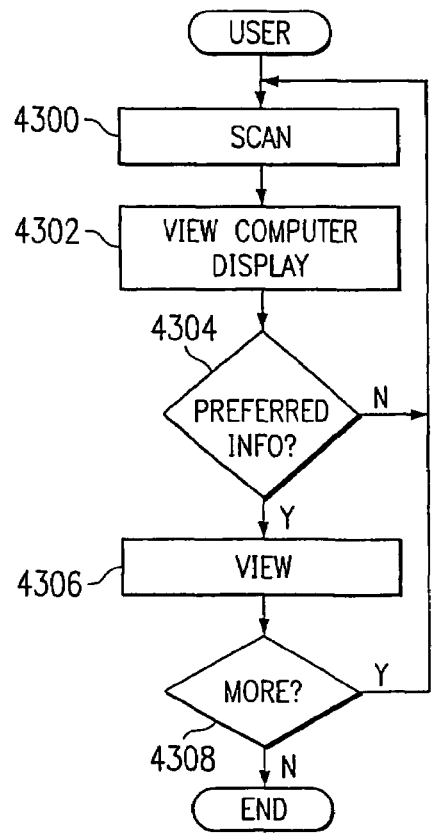
FIG. 43
| MRC DATA | SCANNER ID | ADVERTISER SERVER NET ADDRESS |
|---|---|---|
|  |  |  |
FIG. 44

LAUNCHING A WEB SITE USING A PORTABLE SCANNER

CROSS-REFERENCE TO RELATED APPLICATIONS

This application is a Continuation application of U.S. Ser. No. 09/615,686, entitled; LAUNCHING A WEB SITE USING A PORTABLE SCANNER, which issued on Apr. 5, 2005, as U.S. Pat. No. 6,877,032, which is a Continuation-in-Part of U.S. patent application Ser. No. 09/580,848 entitled "METHOD AND APPARATUS FOR ACCESSING A REMOTE LOCATION BY SCANNING AN OPTICAL CODE" filed on May 30, 2000 and issued as U.S. Pat. No. 6,860,424 on Mar. 1, 2005, which is a Continuation-in-Part of U.S. patent application Ser. No. 09/378,221 entitled "METHOD AND APPARATUS FOR ACCESSING A REMOTE LOCATION BY SCANNING AN OPTICAL CODE" filed on Aug. 19, 1999 and issued as U.S. Pat. No. 6,745,234 on Jun. 1, 2004, which is a Continuation-in-Part of the following two U.S. Patent Applications filed on Sep. 11, 1998: Ser. No. 09/151,471 entitled "METHOD FOR INTERFACING SCANNED PRODUCT INFORMATION WITH A SOURCE FOR THE PRODUCT OVER A GLOBAL NETWORK," now abandoned and Ser. No. 09/151,530 entitled "METHOD FOR CONTROLLING A COMPUTER WITH AN AUDIO SIGNAL," issued as U.S. Pat. No. 6,098,106 on Aug. 1, 2000.

TECHNICAL FIELD OF THE INVENTION

This invention is related to a method of launching a web site using a portable scanner by scanning a machine resolvable code.

BACKGROUND OF THE INVENTION

With the growing numbers of computer users connecting to the "Internet," many companies are seeking the substantial commercial opportunities presented by such a large user base. For example, one technology which exists allows a television ("TV") signal to trigger a computer response in which the consumer will be guided to a personalized web page. The source of the triggering signal may be a TV, video tape recorder, or radio. For example, if a viewer is watching a TV program in which an advertiser offers viewer voting, the advertiser may transmit a unique signal within the television signal which controls a program known as a "browser" on the viewer's computer to automatically display the advertiser's web page. The viewer then simply makes a selection which is then transmitted back to the advertiser.

In order to provide the viewer with the capability of responding to a wide variety of companies using this technology, a database of company information and Uniform Resource Locator ("URL") codes is necessarily maintained in the viewer's computer, requiring continuous updates. URLs are short strings of data that identify resources on the Internet: documents, images, downloadable files, services, electronic mailboxes, and other resources. URLs make resources available under a variety of naming schemes and access methods such as HTTP, FTP, and Internet mail, addressable in the same simple way. URLs reduce the tedium of "login to this server, then issue this magic command . . . " down to a single click. The Internet uses URLs to specify the location of files on other servers. A URL includes the type of resource being accessed (e.g., Web, gopher, FTP), the address of the server, and the location of the file. The URL can point to any file on any networked computer. Current technology requires the viewer to perform periodic updates to obtain the most current URL database. This aspect of the current technology is cumbersome since the update process requires downloading information to the viewer's computer. Moreover, the likelihood for error in performing the update, and the necessity of redoing the update in the event of a later computer crash, further complicates the process. Additionally, current technologies are limited in the number of companies which may be stored in the database. This is a significant limitation since world-wide access presented by the Internet and the increasing number of companies connecting to perform on-line E-commerce necessitates a large database.

Many types of optical readers are known, however, their cost and complexity have heretofore limited their use primarily to industrial and commercial users. Now, many new network-based technologies are being developed for home users which involve optical scanning. Thus, the need for a simple, low cost optical reader which can be attached to a personal computer has emerged.

SUMMARY OF THE INVENTION

The present invention disclosed and claimed herein, in one aspect thereof, comprises a method for a user to access information on a network. Information from a machine recognizable code (MRC) is extracted at a user location, which MRC has associated therewith routing information to a remote location on the network. The extracted information from the MRC is wirelessly transmitted to a network interface device in response to the information being extracted. The remote location associated with the extracted information from the MRC is then connected thereto from the user location and the information downloaded therefrom. The downloaded information is displayed on a display at the user location, such that when displayed, substantially immediate feedback is provided to the user in response to the MRC being scanned.

BRIEF DESCRIPTION OF THE DRAWINGS

For a more complete understanding of the present invention and the advantages thereof, reference is now made to the following description taken in conjunction with the accompanying Drawings in which:

FIG. 2 illustrates the computer components employed in this embodiment;

FIGS. 4a-4e illustrate the various message packets transmitted between the source PC and network servers used in the preferred embodiment.

FIG. 6 illustrates a flowchart of actions taken by the Advertiser Reference Server ("ARS") server;

FIG. 8 illustrates a web browser page receiving the modified URL/advertiser product data according to the preferred embodiment;

FIG. 14 illustrates a flowchart for generating the profile and storing at the ARS;

FIG. 15 illustrates a flowchart for processing the profile information when information is routed to a user;

FIG. 16 illustrates a general block diagram of a disclosed embodiment;

FIG. 17 illustrates the conversion circuit of the wedge interface;

FIG. 18 illustrates a sample message packet transmitted from the user PC to the ARS;

FIG. 41 illustrates a basic data signal sent from the scanner to the PC;

FIG. 42 illustrates a flowchart of the signal interrogation process by the PC;

FIG. 43 illustrates a flowchart of the MRC data processing from the perspective of the user; and FIG. 44 illustrates a database structure used in accordance with one or more disclosed embodiments.

DETAILED DESCRIPTION OF THE INVENTION

Figure 1:
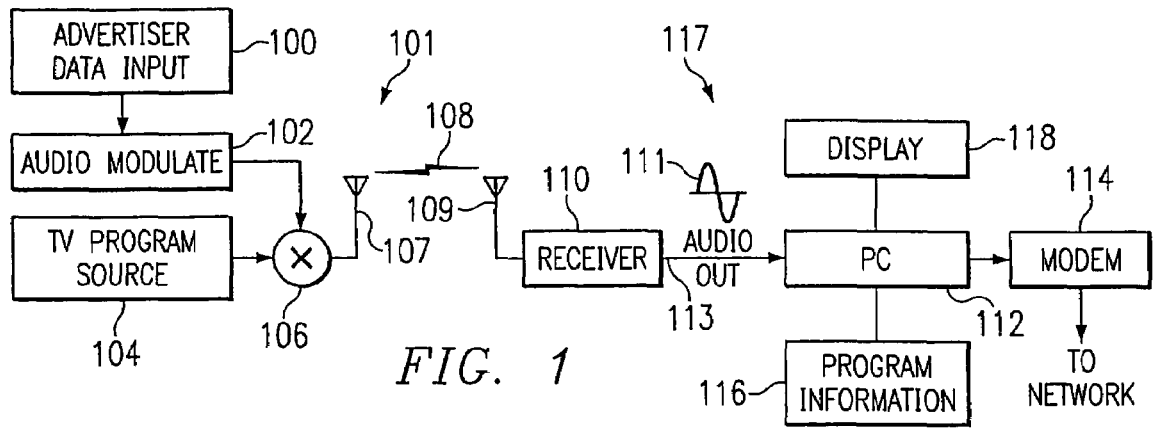
FIG. 1 illustrates a block diagram of the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size.

A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network. The remote server address is in the form of a URL.

This appended data, in addition to other control codes, is inserted directly into the web browser application for automatic routing to the communication network. The web browser running on PC 204, and communicating to the network with an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
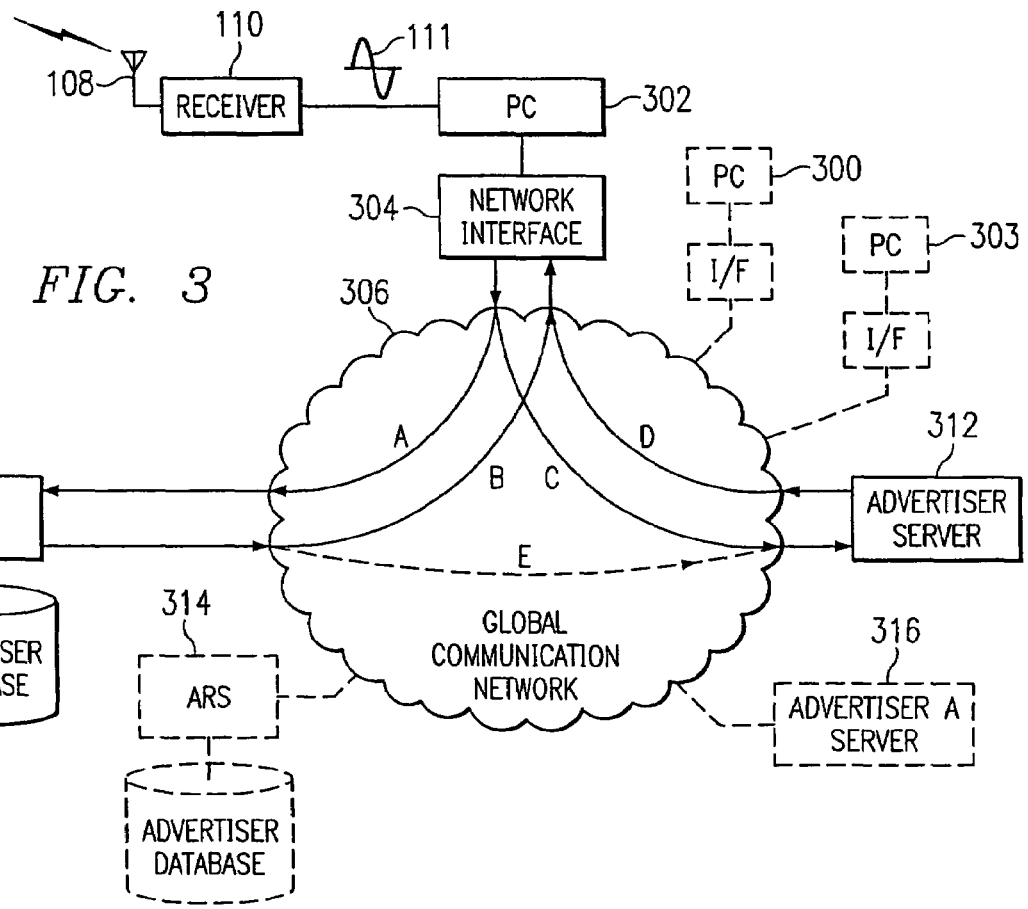
FIG. 3 illustrates system interactions over a global network.

Referring now to FIG. 3, there is illustrated a source PC 302, similar to PCs 204 and 112, connected to a global communication network (GCN) 306 through an interface 304. In this embodiment, the audio signal 111 is received by PC 302 through its sound card 206. The audio signal 111 comprises a trigger signal which triggers proprietary software into launching a web browser application residing on the PC 302.

The audio signal 111 also comprises advertiser product information which is extracted and appended with URL information of an Advertiser Reference Server ("ARS") 308. The ARS 308 is a system disposed on the network 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.e., subscribe to this technology, manufacturer and product information are added to the database 310 without interrupting operation of the source PC 302 with frequent updates. When the advertiser server address URL is obtained from the ARS database 310, it and the request for the particular advertiser product information is automatically routed back through the web browser on PC 302, over to the respective advertiser server for retrieval of the advertiser product information to the PC 302. Additionally, although the disclosed invention discusses a global communication network, the system is also applicable to LANs, WANs, and peer-to-peer network configurations. It should be noted that the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. Within the context of this disclosure, "message packet" shall refer to and comprise the destination URL, product information, and source address, even though more than a single packet must be transmitted to effect such a transmission.

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c, the message packet 404 for this transaction comprises the URL of the advertiser server 312, the request-for-product-information data, and the address of the source PC 302.

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Figures 5, 7:
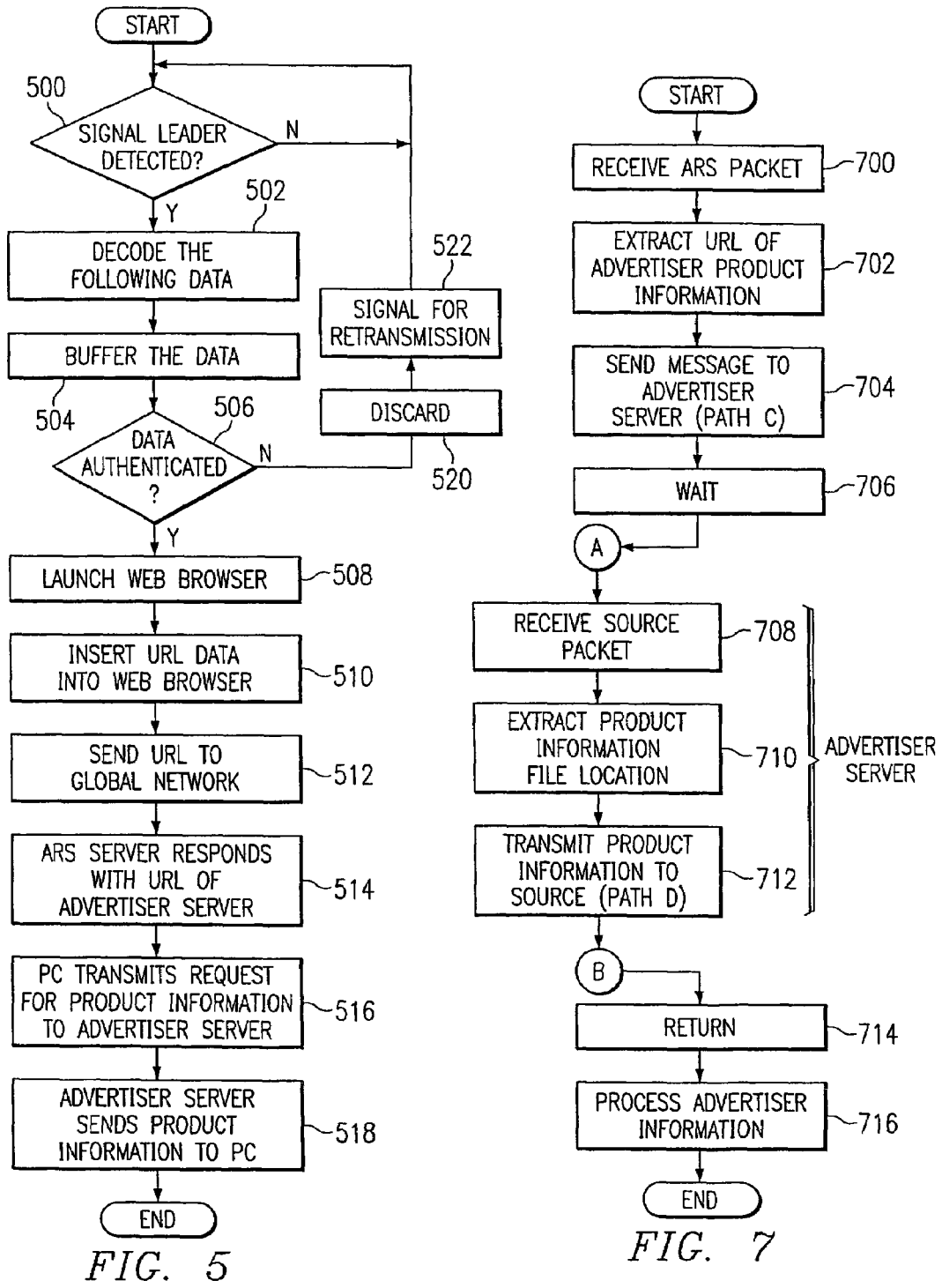
FIG. 5 is a flowchart depicting operation of the system according to the preferred embodiment.
FIG. 7 illustrates a flowchart of the interactive process between the source computer and ARS.

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing. The user may obtain the benefits of this architecture by simply downloading the proprietary software over the network. Other methods for obtaining the software are well-known; for example, by CD, diskette, or pre-loaded hard drives.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Figure 9:
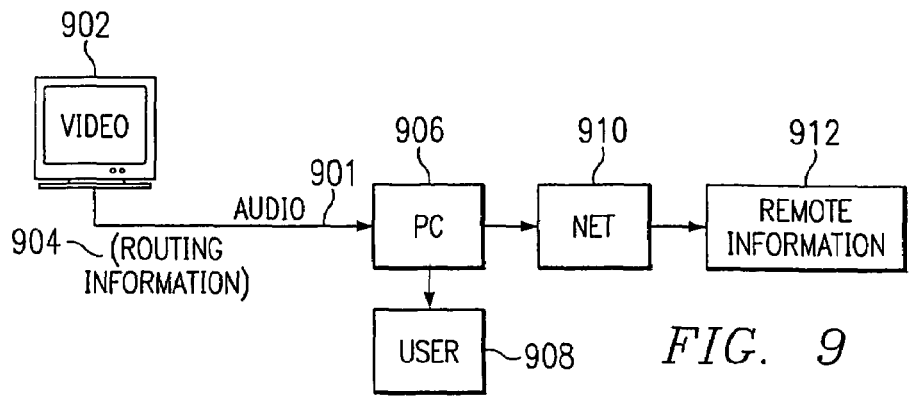
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Figure 10:
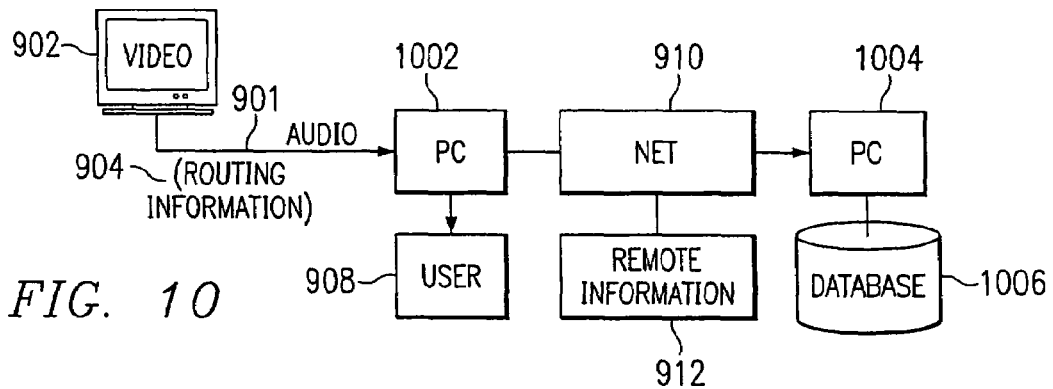
FIG. 10 illustrates a more detailed, simplified block diagram of the embodiment of FIG. 9.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Figure 11:
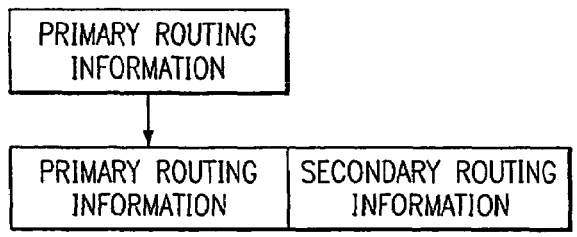
FIG. 11 illustrates a diagrammatic view of a method for performing the routing operation.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Figure 12:
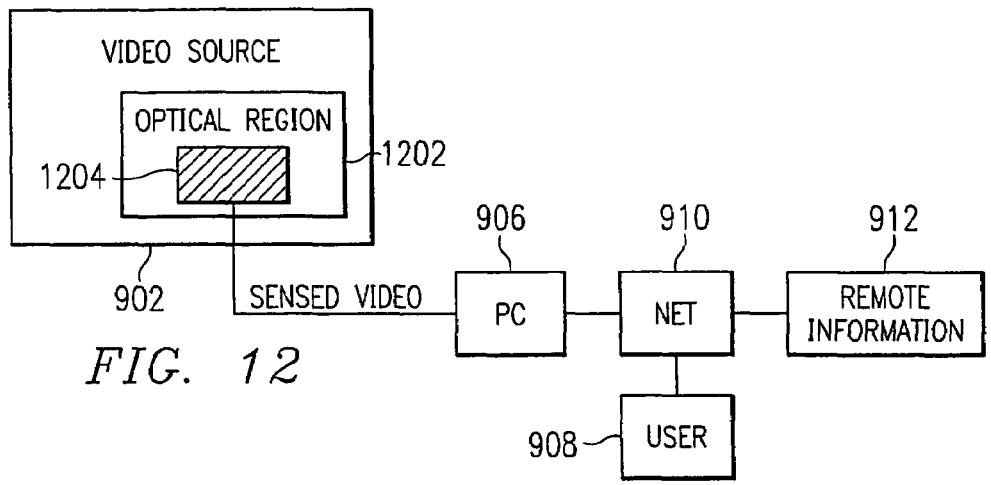
FIG. 12 illustrates a block diagram of an alternate embodiment utilizing an optical region in the video image for generating the routing information.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Figure 13:
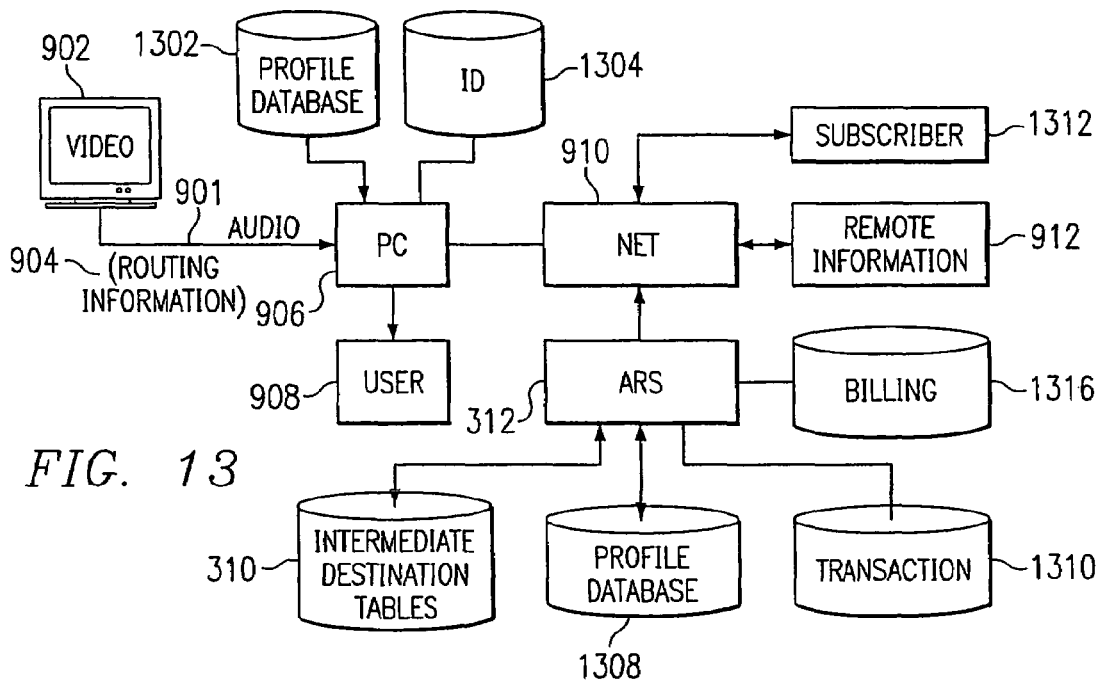
FIG. 13 illustrates a block diagram illustrating the generation of a profile with the disclosed embodiment.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the stored in profile database 1302 for all of the PCs 906 that are attachable to the system. This is to be distinguished from information stored in the database 310 of the ARS 308, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer is associated therewith.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to a decision block 1420 which will timeout to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Referring now to FIG. 15, there is illustrated a flowchart depicting the operation of the host when receiving a transaction. The program is initiated at a Start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to lookup the manufacturer URL that corresponds to the received primary routing information and then return the necessary command information to the originating PC 108 in order to allow that PC 108 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database 1310. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements are or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user PC 302 which will cause the user PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user PC 302 and a profile of the user themselves. Therefore, an advertiser can actually gain real-time information as to the number of individuals that are watching their particular advertisement and also information as to the background of those individuals, profile information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with profile information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Referring now to FIG. 16, there is illustrated a general block diagram of a disclosed embodiment. A bar code scanning input device 1600 is provided by an input device distributor to customers and is associated with that distributor via an input device ID stored therein. The input device 1600 is either sold or freely distributed to customers for use with their personal computing systems. Since more and more products are being sold using bar codes, it can be appreciated that a user having the input device 1600 can scan bar codes of a multitude of products in order to obtain more information. Information about these products can be made immediately available to the user from the manufacturer for presentation by the user's computer 302. Beyond simply displaying information about the product in which the user is interested, the input device distributor may include additional advertising information for display to the user such as information about other promotions or products provided or sold by the input device distributor. Similarly, advertisers may provide catalogs of advertisements or information in newspapers or periodicals where the user simply scans the bar code associated with the advertisement using the input device 1600 to obtain further information. There is provided a paper source 1602 having contained thereon an advertisement 1604 and an associated bar code 1606. (Note that the disclosed concept is not limited to scanning of bar codes 1606 from paper sources 1602, but is also operable to scan a bar code 1606 on the product itself. Also, the input device 1600 can be any type of device that will scan any type of image having information encoded therein.)

After obtaining the input device 1600 from the input device distributor, the user connects the input device 1600 to their PC 302. During a scanning operation, input device 1600 reads bar code data 1606 and the input device ID into a "wedge" interface 1608 for conversion into keyboard data, which keyboard data is passed therefrom into the keyboard input port of PC 302. The importance of the input device ID will be discussed in more detail hereinbelow.

The wedge interface 1608 is simply an interface box containing circuitry that accommodates inputs from both the scanning input device 1600 and a computer keyboard 1610. This merely allows the information scanned by the input device 1600 to be input into the PC 302. In the disclosed embodiment, the wedge interface 1608 will convert any information. The data output from the input device 1600 is passed into the wedge interface 1608 for conversion into keyboard data which is readily recognizable by the PC 302. Therefore, the input device 1600 is not required to be connected to a separate port on the PC 302. This data is recognized as a sequence of keystrokes. However, the output of the input device 1600 can be input in any manner compatible with the PC 302. When not receiving scanner data, the wedge interface 1608 simply acts as a pass-through device for keyboard data from the keyboard 1610. In any case, the information is ultimately processed by a processor in the PC 302 and can be presented to the user on a display 1612. The wedge interface 1608 is operable to provide a decoding function for the bar code 1606 and conversion thereof to keystroke input data.

In operation, the product code of a product is provided in the form of a bar code 1606. This bar code 1606 is the "link" to a product. The disclosed embodiment is operable to connect that product information contained in the bar code 1606 with a web page of the manufacturer of that product by utilizing the bar code 1606 as the product "identifier." The program operating on the PC 302 provides routing information to the ARS 308 after launching the browser on the PC 302 and connecting to the ARS 308 over the GCN 306, which ARS 308 then performs the necessary steps to cause the browser to connect to the manufacturer web site, while also providing for an accounting step, as will be described in more detail hereinbelow.

The bar code 1606 by itself is incompatible with any kind of network for the purposes of communication therewith. It is primarily provided for a retail-type setting. Therefore, the information contained in the bar code 1606, by itself, does not allow for anything other than identification of a product, assuming that one has a database 1614 containing information as to a correlation between the product and the bar code 1606.

The wedge interface 1608 is operable to decode the bar code 1606 to extract the encoded information therein, and append to that decoded bar code information relating to an ID for the input device 1600. This information is then forwarded to the ARS 308 by the resident program in the PC 302. This is facilitated by intermediate routing information stored in the program indicating to which node on the GCN 306 the scanned bar code information is to be sent, i.e., to the ARS 308. It is important to note that the information in the bar code 1606 must be converted from its optical image to numerical values which are then ultimately input to the keyboard input port of PC 302 and converted into data compatible with communication software residing on the PC 302 (in this case, HTML language for insertion into a browser program). When the scanned information is input to the PC 302, the resident program launches the browser program and then assembles a communication packet comprised of the URL of the ARS 308, the input device ID and the user ID. If another type of communications program were utilized, then it would have to be converted into language compatible with that program. Of course, a user could actually key in the information on the bar code 102 and then append the appropriate intermediate routing information thereafter. As will be described hereinbelow, the intermediate routing information appended thereto is the URL of the ARS 308 disposed on the GCN 306.

As part of the configuration for using the input device 1600, the PC 302 hosts input device software which is operable to interpret data transmitted from the input device 1600, and to create a message packet having the scanned product information and input device ID, routing information, and a user ID which identifies the user location of the input device 1600. The input device software loads at boot-up of the PC 302 and runs in the background. In response to receiving a scanned bar code 1606, the wedge interface 1608 outputs a keystroke code (e.g., ALT-F10) to bring the input device program into the foreground for interaction by the operating system. The input device program then inserts the necessary information into the browser program. The message packet is then transmitted to interface 304 across the global communication network 306 to the ARS 308. The ARS 308 interrogates the message packet and performs a lookup function using the ARS database 310. If a match is found between particular parameters of the message packet, a return message packet is sent back to the PC 302 for processing.

The input device program running on PC 302 functions to partition the browser window displayed to the user into several individual areas. This is for the purpose of preparing to present to the user selected information in each of the individual areas (also called "framing"). The selected information comprises the product information which the user requested by scanning the bar code 1606 using the input device 1600, information about the input device distributor which establishes the identity of the company associated with that particular input device 1600, and at least one or more other frames which may be advertisements related to other products that the input device distributor sells. Note that the advertisements displayed by the input device distributor may be related to the product of interest or totally unrelated. For example, if a user scans the bar code 1606 of a soda from Company A, the input device distributor may generate an advertisement of a new soft drink being marketed by Company A, that it sells. On the other hand, the input device distributor may also structure the display of information to the user such that a user requesting product information of a Product X may get the requested information of Product X along with advertisements for a competing item Product Y. Essentially, the input device distributor is free to generate any advertisement to the user in response to the user requesting product information.

The return message packet transmitted from the ARS 308 to the PC 302 is then transmitted back across the GCN 306 to the advertiser server 312. The advertiser server 312 restructures the message packet and appends the particular product information for transmission back to the PC 302. Upon receiving the particular advertiser information from advertiser server 312, the PC 302 then retransmits a message to the input device distributor site 1616 and E-commerce site 1618 to obtain the information that needs to be framed in the browser window displayed to the user.

Therefore, the input device 1600 is associated with the input device distributor by way of an input device ID such that scanning a product bar code 1606 in order to obtain information about that particular product generates one or more responses from one or more remote sites disposed on the GCN 306. Stored in the input device 1600 is the input device ID which establishes its relationship to the input device distributor. Proprietary input device software running on the PC 302 operates to decode scanned bar code information and the input device ID received from the input device 1600 and wedge interface 1608, and also provides a unique user ID for establishing the location of the user of the input device 1600. The input device software also assembles message packets and works in conjunction with the on-board communication software (e.g., a browser) to automatically route the message packets across the GCN 306 such that the one or more remote sites disposed on the GCN 306 return information to be framed for presentation to the user.

Referring now to FIG. 17, there is illustrated a conversion circuit of the wedge interface. A microcontroller 1700 provides conversion of the data from the input device 1600 and controls interfacing of the keyboard 1610 and input device 1600 with the PC 302. The microcontroller 1700 has contained therein a memory 1702 or it can have external memory. There are provided a plurality of input device interfaces 1704 to the input device 1600, a plurality of PC interfaces 1706 to the PC 302, and plurality of keyboard interfaces 1708 to the keyboard 1610. In general, the input device interfaces 1704 comprise a serial data line, a ground line, and a power line. Similarly, the keyboard interfaces 1708 comprise a serial data line, a ground line, a clock line, and a power line. The PC 302 provides a clock line, a power line, a serial data, and a ground line for input to the microcontroller 1700. The microcontroller 1700 is operable to receive signals from the keyboard 1610 and transfer the signals to the PC 302 as keyboard signals. Operation with the keyboard 1610 is essentially a "pass-through" procedure. Data output from the keyboard 1610 is already in keyboard format, and therefore requires no conversion by the wedge interface 1608. With respect to the input device 1600, the serial data is not compatible with a keyboard 1610 and, therefore, it must be converted into a keyboard format in order to allow input thereof to the keyboard input of the PC 302.

The microcontroller 1700 performs this function after decoding this bar code information, and conversion of this bar code information into an appropriate stream of data which is comprised of the bar code information and the appended URL. This appended URL will be pre-stored in the memory 1702 and is programmable at the time of manufacture. It is noted that the memory 1702 is illustrated as being contained within the microcontroller 1702 to provide a single chip solution. However, this could be external memory that is accessible by the microcontroller 1702. Therefore, the microcontroller 1700 provides an interface between the input device 1600 and the keyboard 1610 to the PC 302 which allows the input device 1600 to receive coded information and convert it to keyboard strokes or, alternatively, to merely pass-through the keystrokes from the keyboard 1610. Therefore, the user need not install any type of plug-in circuit board into the motherboard of the PC 302 in order to provide an interface to the input device 1600; rather, the user need only utilize the already available keyboard port in order to input the appropriate data into the system.

In this particular disclosed embodiment, the microcontroller 1700 comprises a PIC16C73 microcontroller by Microchip Technologies™. The PIC16C73 device is a low cost CMOS 8-bit microcontroller with an integrated analog-to-digital converter. The PIC16C73 device, as illustrated in the disclosed embodiment, has 192 bytes of RAM and 4k×4 of EPROM memory. The microcontroller 1700 can accommodate asynchronous or synchronous inputs from input devices connected to it. In this disclosed embodiment, communication to the keyboard 1610 is synchronous while it is asynchronous when communicating with input device 1600.

It should be noted that, although in this particular embodiment bar code information of the bar code 1606 is input into the keyboard input port of the PC 302, disclosed methods may also be advantageously utilized with high speed port architectures such as Universal Serial Bus ("USB") and IEEE 1394.

Bar codes are structured to be read in either direction. Timing considerations need to be addressed because of the variety of individuals scanning the bar code introduce a wide variety of scan rates. Bar codes use bars of varying widths. The presence of a black bar generates a positive pulse, and the absence of a black bar generates no pulse. Each character of a conventional bar code has associated therewith seven pulses or bars. Depending on the width of the bars, the time between pulses varies. In this disclosed embodiment, the interface circuitry 1608 performs a "running" calculation of the scan time based upon the rising edge of the pulses commencing with the leader or header information. The minimum and maximum scans times are calculated continuously in software with the interface 1608 during the scanning process to ensure a successful scan by the user.

Referring now to FIG. 18, there is illustrated a sample message packet transmitted from the user's PC 302 to the ARS 308. The message packet 1800 comprises a number of bits of information including the bar code information 1802 obtained from the user scanning the bar code 1606 with the input device 1600; the input device ID 1804 which is embedded in a memory in the input device 1600 and identifies it with a particular input device distributor; and a user ID 1806 which is derived from the software running on the PC 302 and which identifies uniquely with the user location. Note that the message packet includes other necessary information for the proper transmission for point to point.

Figure 19:
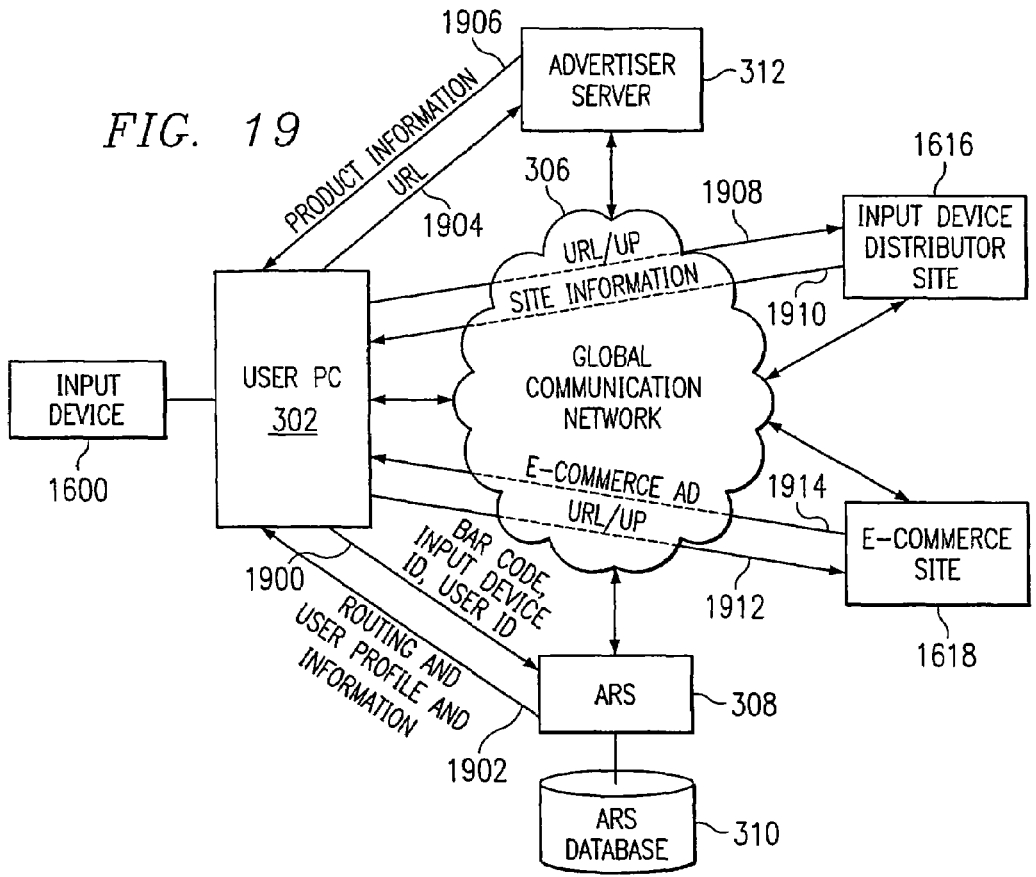
FIG. 19 illustrates a more detailed block diagram of the routing of the message packets between the various nodes.

Referring now to FIG. 19, there is illustrated a more detailed block diagram of the routing of the message packets in order to present the framed information to the user. As is mentioned hereinabove, when the user scans a bar code 1606 using the input device 1600, an input device program running on the user PC 302 is operable to interpret the information output by the input device 1600 and generate a message packet for transmission over the GCN 306. The input device program assembles the message packet such that it is directed to the ARS 308 disposed on the GCN 306. The message packet contains several pieces of information including the input device ID 1804 which links it to the input device distributor, the user ID 1806 which identifies the particular user using the input device 1600, and bar code information 1802 describing a particular product of interest to the user. This message from the PC 302 is transmitted over a path 1900 to the ARS 308 where the ARS database 310 is accessed to cross reference the ID information 1804 and bar code information 1802 to a particular advertiser and input device distributor. The ARS 308 returns a message packet over a path 1902 to the user PC 302 which contains routing information as to the location of various other sites disposed on the GCN 306, for example, the advertiser server 312 and input device distributor site 1616.

It can be appreciated that other information can also be provided by the ARS 308 which more closely targets the particular user of the input device 1600. For example, if it is known that a particular input device 1600 is sold in a certain geographic area, this information can be useful in targeting the particular user with certain advertising information relevant to that geographic area. In any case, the information returned from the ARS 308 over path 1902 provides enough information for the input device program running on the user PC 302 to identify a number of other sites disposed on the GCN 306. The user PC 302 then processes the return message packet and routes another message packet over a path 1904 to the advertiser server 312. The advertiser server 312 then returns product information of the particular product in which the user was interested back to the user PC 302 over a path 1906. Similarly, the user PC 302 routes information (e.g., the URL of the input device distributor site and the user profile) to the input device distributor site 1616 over a path 1908 in order to obtain information back over a path 1910 for framing any banners which identify the input device distributor. Additionally, the user PC 302 forwards a message packet to the E-commerce site 1618 over a path 1912 in order to return information regarding any particular advertisements the input device distributor wants to display to the user. The advertisements are returned to the PC 302 over a path 1914.

Figure 20:
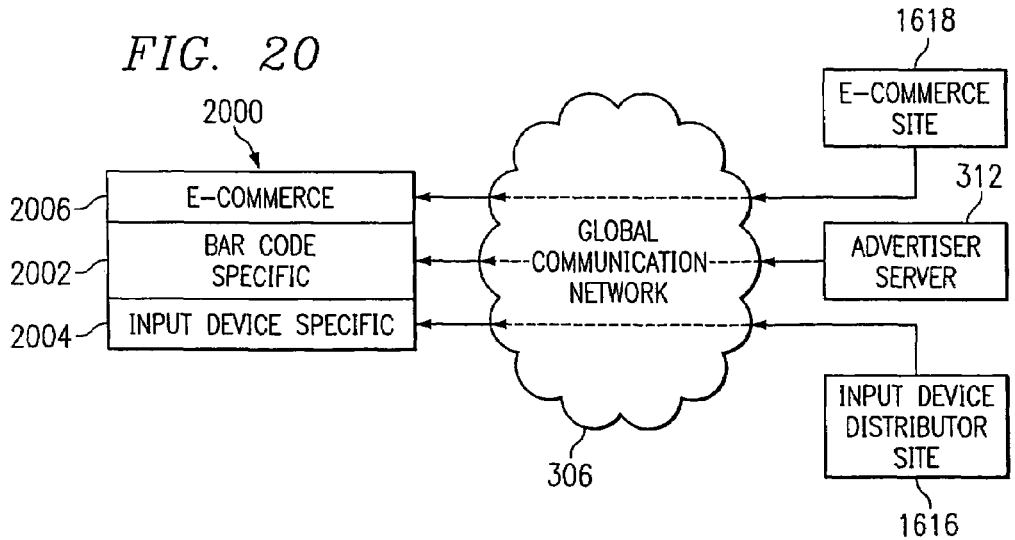
FIG. 20 illustrates a block diagram of a browser window, according to a disclosed embodiment.

Referring now to FIG. 20, there is illustrated a block diagram of a browser window according to the disclosed embodiment. The browser window 2000 is partitioned into a plurality of areas for framing specific information. A bar code area 2002 displays that product information in which the user was interested; an input device-specific area 2004 displays information about the input device distributor; and an E-commerce area 2006 displays advertising information that the input device distributor selects for display according to this particular user and input device 1600. As mentioned hereinabove, a program operable to process scanned bar code information with the unique input device 1600 develops the browser window by partitioning it into specific areas for the framing of information. Therefore, information returned from the E-commerce site 1608 is passed through the GCN 306 to the particular E-commerce frame 2006. Similarly, information about the particular product of interest is returned from the advertiser site 312 across the GCN 306 to the particular bar code specific area 2002. Information placed in the input device specific area 2004 is information about the input device distributor which is returned from the input device distributor site 1616 across GCN 306.

Figure 21:
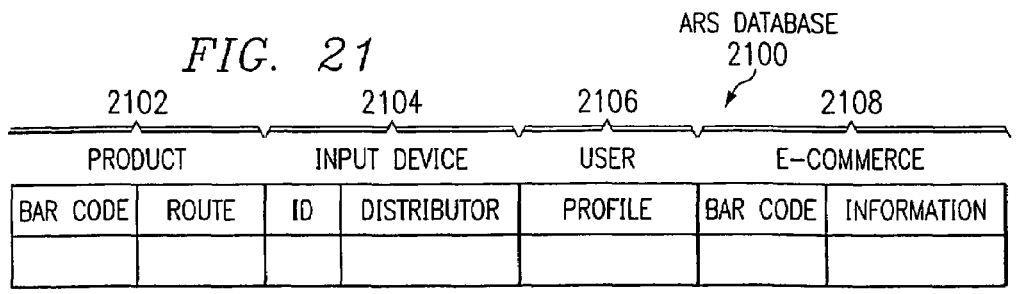
FIG. 21 illustrates a diagrammatic view of information contained in the ARS database.

Referring now to FIG. 21, there is illustrated a structure of information contained in the ARS database. The ARS database 310 contains a variety of information required to properly interrogate and assemble packets for obtaining information from the various sites disposed on the GCN 306. The ARS database 310 has a database structure 2100 which contains addresses for the web sites containing the product information requested by the user when scanning the bar code 1606 with the input device 1600. Under a PRODUCT heading 2102 are listed the particular bar codes and associated routing information for addressing the respective server location. For example, the ARS server 308 may contain any number of advertisers having unique URL addresses associated therewith. Therefore, the bar code 1606 of a particular product is associated with a unique URL address which routes any request for information of that product to that particular advertiser's site. Also part of the ARS database structure 2000 is a heading of INPUT DEVICE under which is the input device ID 1804 and the distributor associated with that input device ID 1804.

It can be appreciated that there may be a number of distributors using the disclosed architecture such that each distributor has an ID embedded in the input device 1600 which uniquely identifies that input device with the particular distributor. Therefore, the unique input device ID 1804 needs to be listed with the respective distributors of that input device 1600 in order to process the information that needs to be framed and displayed to that particular user. Another heading under the ARS database structure 2100 is a user heading 2106 which contains profile information associated with that particular user ID 1806. As mentioned hereinabove, the user ID 1806 is obtained via the input device software running on the PC 302 and upon installation or subsequent configuration may request that the user input certain profile information which may be used to target that particular user with products and services which identify with that user profile. The ARS database structure 2100 also contains an E-commerce heading 2108 which contains information related to the bar code 1606 and an advertisement that may be triggered by the request for that information. For example, any bar code 1606 associated with a paper source 1602 can be associated with the specific information in the ARS database 310. A user wishing to obtain information about a specific soft drink may, in fact, trigger an advertising response of a competitor product. Similarly, the user interested in information about that particular soft drink may also trigger information which is relevant to that particular product or a product which may normally be served in conjunction with that soft drink. Furthermore, if the user profile indicates that this individual has significant interest in finance or insurance, the request for information regarding this particular bar coded product may trigger advertisement from an E-commerce server 1618 related to information about finance and insurance. It should be noted that the information described as contained within the ARS database structure 2100 is not limited to what has been described, but may comprise any number of pieces of information used to present desired information to the computer display of the user.

Figure 22:
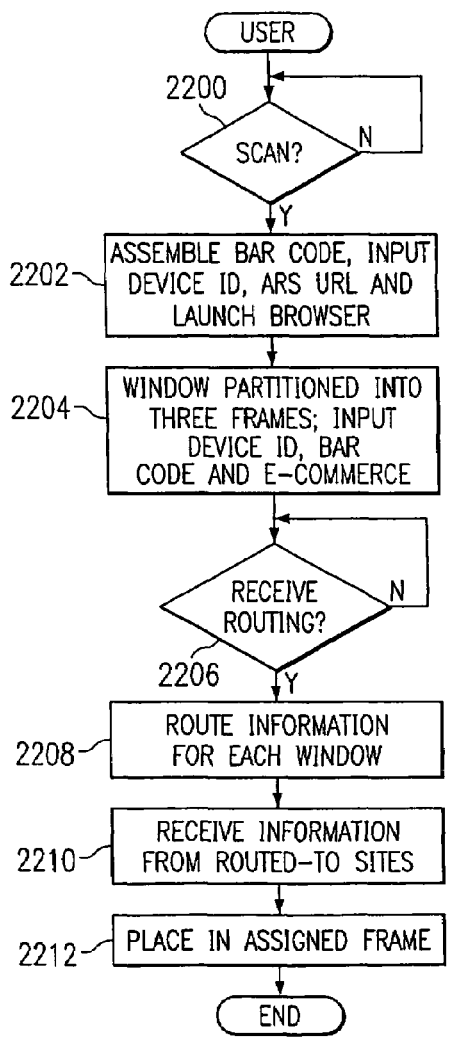
FIG. 22 illustrates a flowchart of the process of receiving information for the user's perspective.

Referring now to FIG. 22, there is illustrated a flowchart of the process of receiving information from the user's perspective, and according to the disclosed embodiment. The input device software running on the user's PC 302 runs in the background until activated by output from the input device 1600. Therefore, flow moves to a decision block 2200 where if a scanned input does not occur, flow moves out the "N" path and loops back to the input of decision block 2200. On the other hand, if scanned input information is received, flow moves out the "Y" path to a function block 2202 where the input device software assembles a message packet containing the bar code information, the input device ID 1804 and the ARS 308 URL address. Additionally, the browser is launched in which this information is placed for transmission to the ARS 308. Flow then moves to a function block 2204 where the browser is partitioned into any number of areas in which information is displayed when obtained from the input device distributor site 1616, the E-commerce site 1618, and the advertiser server 312. It should be known that although three frames are shown in the particular window 2000 of this embodiment, the number of frames displayed in the window 2000 is limited only by the available real estate of the window 2000 area itself.

After the input device software partitions the browser window into one or more frames in preparation of receipt of return information, flow moves to a decision block 2206 where the computer waits for information to be returned from the various sites disposed on the GCN 306. If information is not returned, flow moves out the "N" path and simply loops back to the input to continue monitoring for receipt of the information. If information has been received, flow moves out the "Y" path to a function block 2208 where routing information for each frame (or partitioned area of the window 2000) is inserted into one or more packets for transmission to the various sites. The various sites then return the requested information back to the PC 302, as indicated in function block 2210. Flow is then to a function block 2212 where the proprietary software working in conjunction with the hosted browser places the returned information into the respective frames of the window. The user, viewing the display at PC 302, then perceives a variety of information, one of which is the particular product information which he or she requested, in addition to input device distributor information, and possibly other advertisements based upon the user's profile.

Figure 23:
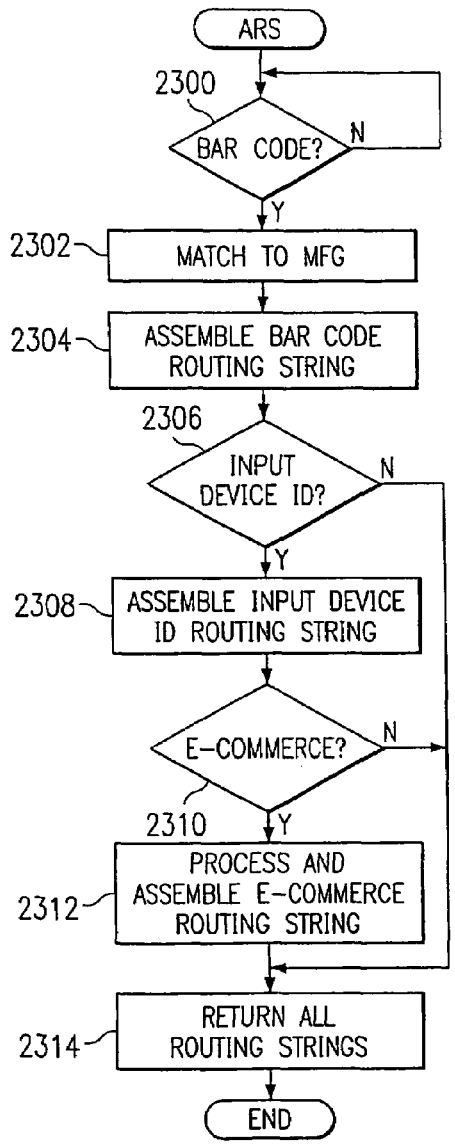
FIG. 23 illustrates a flowchart according to the ARS.

Referring now to FIG. 23, there is illustrated a flowchart of the process according to the ARS. The ARS 308 is operable to decode and process messages received from the GCN 306. Therefore, flow is to a decision block 2300 where, if bar code information is not received, flow is out the "N" path with loop-back to its input. If bar code information has been received, flow is to a function block 2302 where a matching process occurs to link the bar-coded product information to its respective manufacturer. The ARS database 310 also associates the URL address of the manufacturer's server. When a match is found, the ARS 308 begins to assemble a message packet of information for transmission back to the PC 302, as indicated in function block 2304. The message packet contains the product information and the URL address of the manufacturer's website. Flow then moves to a decision block 2306 where the input device ID 1804 is compared with the list of input device IDs issued by the particular input device distributor. If the input device ID 1804 is validated, flow moves out the "Y" path to a function block 2308 where the message packet is appended with the input device ID 1804 and distributor routing address. Flow then moves to a decision block 2310 where the ARS 308 determines if any E-commerce information is to be associated with a particular input device ID 1804. If so, flow is out the "Y" path to a function block 2312 where the message packet is appended with the E-commerce routing string. The E-commerce routing string provides addressing for the E-commerce server 1618. Flow then moves to a function block 2314 where all message packets are returned back to the PC 302 for processing.

Referring back to decision block 2306, if the input device ID 1804 is determined to be invalid, flow moves out the "N" path and jumps forward to the input of decision block 2314, since the lack of an input device ID 1804 interrupts the link to any advertising provided by the E-commerce server 1618. At this point, the only information provided is the link to the advertiser server 312 for return of product information. Referring now to decision block 2310, if no E-commerce information is available, flow moves out the "N" path and jumps forward to the input of function block 2314 where the message packet back to the PC 302 contains only the URL of the advertiser server 312, the bar code information, the distributor server 1616 address and input device ID 1804 information.

Figure 24:
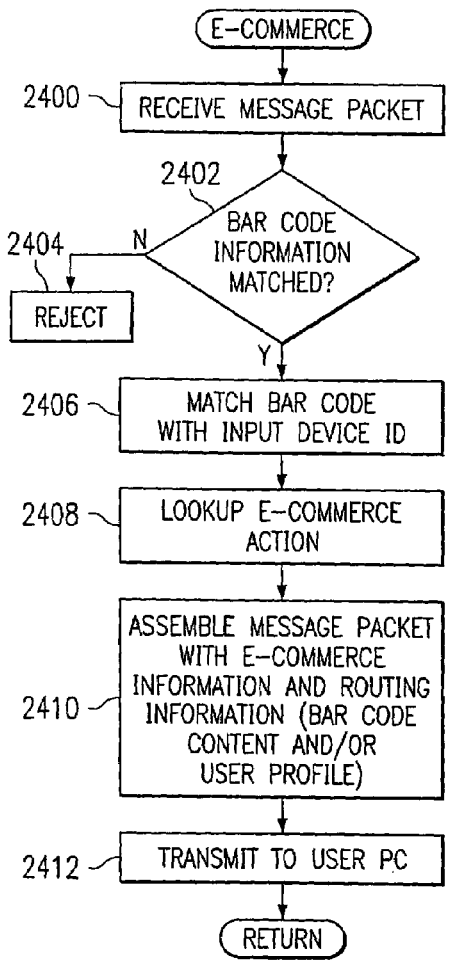
FIG. 24 illustrates a flowchart of the process performed at the E-commerce node.

Referring now to FIG. 24, there is illustrated a flowchart of the process performed at the E-commerce site. The E-commerce server 1618 receives the message packet from the user PC 302, as indicated in function block 2400, and decodes the packet to perform a match with the bar coded information. Moving on to a decision block 2402, if the match is unsuccessful, flow is out the "N" path to a function block 2404 where the match is rejected. A message may be returned to indicate that a problem occurred and the user may need to re-scan the product bar code 1606. If a successful match occurs, flow moves out the "Y" path to a function block 2406 where the input device ID 1804 is matched with the bar code product information. The bar coded information may be distributed to customers over a large geographic area. However, the input device 1606 may be coded for certain geographic areas. For example, an input device 1600 having an XXX ID may be restricted for sale in the Southwestern United States while an input device 1600 having a YYY ID may be sold only in the Northeast. In this way, geographic areas may be targeted with advertising more appealing to that particular area. Advertising returned to the user PC 302 may be focused further by obtaining a user profile when the software or input device 1600 are installed. In this way, advertising may be focused based upon the user profile. Therefore, flow moves to a function block 2408 to lookup the E-commerce action based upon the input device ID 1804 and the bar code information. Flow moves to a function block 2410 to assemble all the information into a packet for return to the user PC 302. The product information and/or user profile information may be returned. Flow is then to a function block 2412 where the message packet is transmitted.

Figure 25:
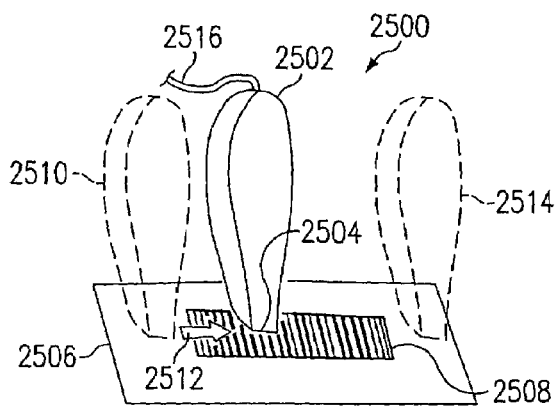
FIG. 25 illustrates reading a bar code with an optical reader according to an embodiment of the invention.

Referring now to FIG. 25, there is illustrated an optical reader which can be used for scanning an optical code, for example a bar code, and delivering signals indicative of the optical code to a computer. Reader 2500 typically includes an outer shell 2502 enclosing the working components and shaped for convenient manual grasping by the user. During operation, the front end 2504 of the reader 2500 is brought into contact with (or very close proximity to) a surface 2506 bearing the optical code to be read, for example bar code 2508. The reading operation begins with the reader 2500 positioned at a starting position (shown in phantom and denoted by reference numeral 2510) to one side of the bar code 2508. The reader 2500 is then moved across the bar code 2508 as indicated by arrow 2512 to a final position (shown in phantom and denoted by reference numeral 2514) on the opposite side. Typically, the reader 2500 must be moved across the bar code 2508 at a substantially constant speed to ensure accurate reading of the symbol. Once the optical symbol has been scanned by the optical reader 2500, internal circuitry produces electronic output signals indicative of the symbol. These electronic output signals are provided to a computer (not shown), typically by means of a wired control cord 2516. Alternately, the output signals may be sent from the reader 2500 to the computer using other known transmission technologies, for example using a wireless radio frequency (RF) link or a wireless infrared (IR) link.

Figure 27:
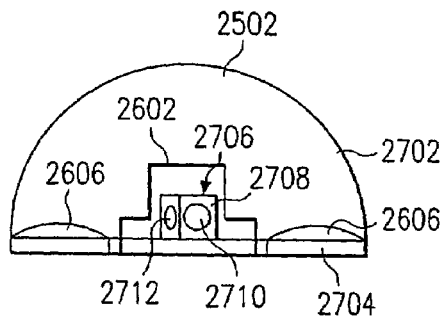
FIG. 27 illustrates a front elevation view of the optical reader viewed from line 27-27 of FIG. 26.
Figure 26:
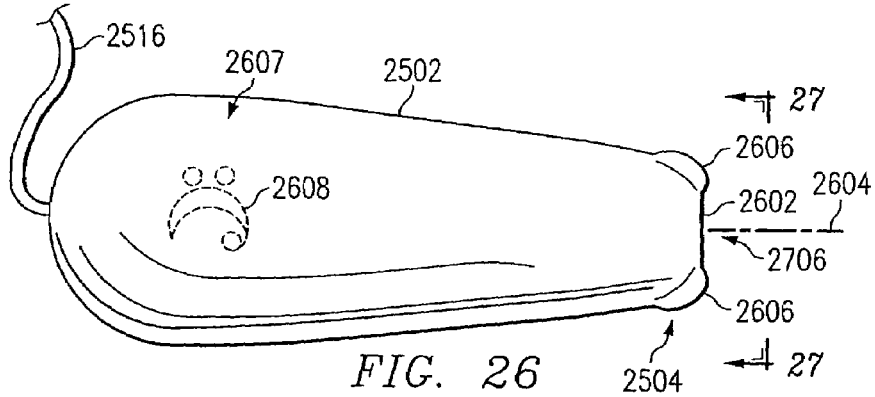
FIG. 26 illustrates a top plan view of an optical reader according to an embodiment of the invention.

Referring now to FIGS. 26 and 27, there are illustrated external views of optical reader 2500 according to an embodiment of the invention. Typically, the outer shell 2502 of the reader 2500 will be constructed from multiple pieces to allow simple assembly of the internal components. For example, the illustrated embodiment includes an upper shell 2702 and a lower shell 2704 which form a hollow interior cavity within which the internal components are mounted. To provide for easier gripping and to prevent the device from rolling across flat surfaces, the upper shell 2702 may have a generally semicircular cross section and the lower shell 2704 may have a generally flat cross section. A scanning portal 2706 is provided at the front end 2504 of reader 2500 to allow the interior components to project and collect radiant energy during the scanning operation. The scanning portal 2706 is typically covered by a protective window 2708 which is transparent to the radiant energy wavelength used for scanning. Projection and/or collection lenses may be visible behind the window 2708. For example, in FIG. 27, a collection lens 2710 and a projection lens 2712 are visible through the window 2708.

To assist the user in maintaining the proper orientation of the reader 2500 during the scanning operation (i.e., with the front end 2504 substantially flat against the surface 2506 bearing the optical symbol, the front end 2504 may be adapted to form a substantially flat bearing surface 2602 surrounding the scanning portal 2708. The bearing surface 2602 is preferably substantially perpendicular to the axis 2604 of the collection portion of the optical system. To reduce the likelihood that the scanning window 2708 will be scratched during the scanning process, it may be inset slightly behind the plane of the bearing surface 2602. The window 2708 may be further protected by the provision of pads 2606 on external shell 2502 which project slightly ahead of the bearing surface 2602.

The external shell 2502 of the reader 2500 may be contoured to provide a comfortable grasp for the user and/or to have an attractive or distinctive shape. For example, the upper shell 2702 of the reader 2500 is smoothly contoured to provide a "streamlined" appearance in accordance with a common style used on other computer related devices such as a computer mouse, a track ball, etc. In other embodiments, however, the exterior shell may be contoured to provide a more distinctive appearance. The exterior surface of the outer shell 2502 further provides an area 2607 for the placement of identifying or advertising indicia 2608 (shown in phantom). Such indicia, if present, may be formed by printing or painting directly on the exterior surface of the reader 2500, by the application of discrete labels, and/or by molding letters, designs or other indicia directly into the surface of the reader by means of injection molding or a similar process.

Figure 28:
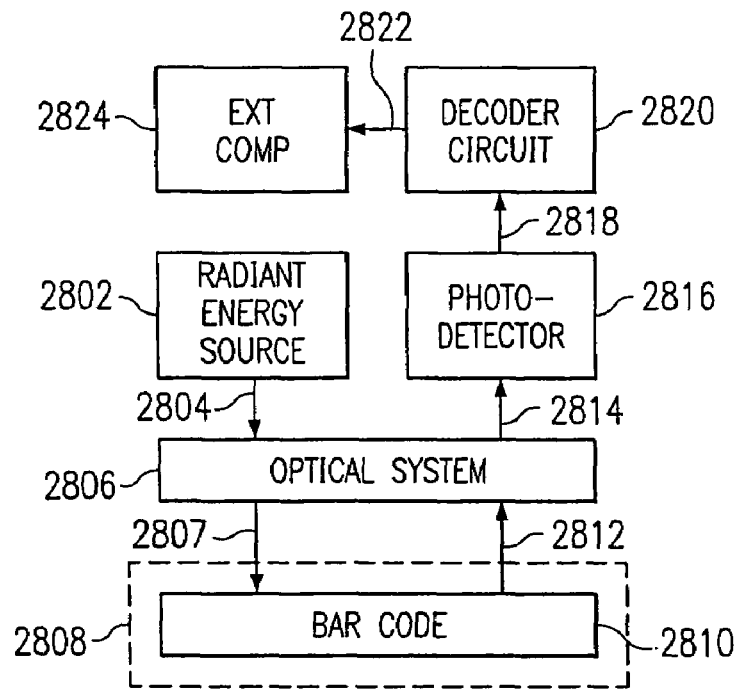
FIG. 28 illustrates a general functional block diagram of the components of an optical reader in accordance with an embodiment of the invention.

Referring now to FIG. 28, there is illustrated a general block diagram showing the function of an optical reader in accordance with embodiments of the current invention. A radiant energy source 2802 is provided for generating a radiant energy which will be used for illuminating a target region containing the bar code or other symbol to be scanned. The radiant energy, denoted by arrow 2804, is transmitted from the source 2802 into an optical system 2806. The radiant energy is typically light in the visible wavelength, however light of infrared (IR) wavelength or other forms of radiant energy may be used. The optical system 2606, which will be described in further detail below, directs the radiant energy (now denoted by arrow 2807) into a target region 2808 adjacent to the reader. The radiant energy directed into the target region 2808 illuminates a bar code 2810 present therein and causes an image, denoted by arrow 2812, of the bar code to be reflected back into another portion of the optical system 2806. The reflected image of the bar code passes through the optical system 2806 where it is processed to increase its contrast and decrease its luminance. After processing, the image, denoted now by arrow 2814, is directed by the optical system 2806 onto a photodetector 2816, which produces output electrical signals indicative of the radiant energy incident thereon. The output electrical signals, denoted by arrow 2818, are routed to a decoder circuit 2820, which utilizes electronic circuitry to decode the output electrical signals to provide an indication of the information contained in the bar code 2810. The information, denoted by reference numeral 2822, is then transmitted to an external computer 2824 for further use or processing.

Typically, the decoded information 2822 is transmitted to the external computer 2824 in accordance with a known data interface format. Suitable data interface formats for transmission of the bar code information from the decoder circuit 2820 of the reader to an external computer 2824 include an output signal which emulates computer keyboard keystrokes such as those in accordance with the PS/2 keyboard interface standard or the AT keyboard interface standard. Alternately, the output signals may be formatted in accordance with other known data interface or communication standards, including the Universal Serial Bus (USB) standard, the RS-232 standard, the RS-423 standard, the IEEE 1394 (FIREWIRE) standard, the Integrated Drive Electronics (IDE) interface standard, the Enhanced Integrated Drive Electronics (EIDE) interface standard, the Asynchronous Transfer Mode (ATM) transmission standard, the Fiber Distributed Data Interface (FDDI) interface standard, the 8-Bit Industry Standard Architecture (ISA) bus standard, the 16-bit Industry Standard Architecture (ISA) bus standard, the VL-Bus bus standard, the Peripheral Component Interconnect (PCI) bus standard, the Personal Computer Memory Card International Association (PCMCIA) bus standard, the Centronics Parallel Port (CPP) standard, the Enhanced Parallel Port (EPP) standard, the Extended Capabilities Port (ECP) standard, the Small Computer System Interface (SCSI) interface standard, and network architecture standards including Ethernet and Token Ring network standards.

Figure 29:
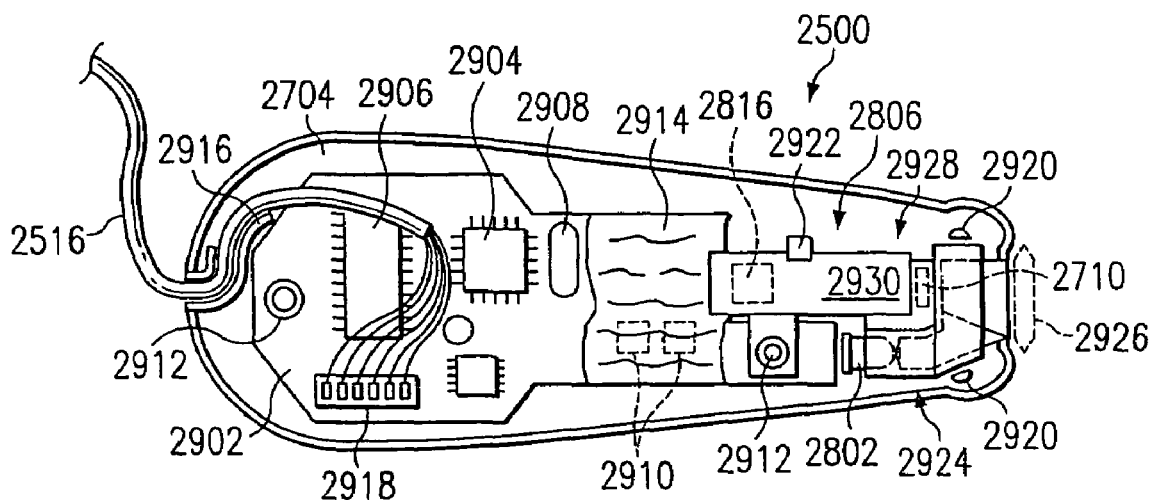
FIG. 29 illustrates the optical reader of FIG. 26 with portions of the outer shell removed to show the interior components.

It is desirable to provide an optical reader which is economical to produce, therefore reducing the number of components and simplifying the design and construction of the remaining components are important features of the current invention. Referring now to FIG. 29, there is illustrated the optical reader 2500 with the upper shell removed to show the interior components. A printed circuit board (PCB) 2902 is provided for physical mounting and electrical interconnection of the necessary electronic components comprising the decoder circuit and output signal interface circuit. These components include a microprocessor 2904, memory (not shown), interface circuit 2906, timing crystal 2908 and signal amplifiers 2910. Note that for clarity of illustration, the individual circuit lines and many smaller components such as resistors which appear on the actual PCB 2902 are not illustrated in FIG. 29. The PCB 2902 may be mounted to the lower shell 2704 of the reader by means of locating pins 2912 molded into the shell and protruding through corresponding holes in the PCB. These holes can further receive screws (not shown) for securing the upper shell 2702 to the lower shell 2704 during final assembly. The portion of the PCB 2902 mounting amplifiers 2910 is preferably enclosed is shielding material 2914 to prevent stray electrical signals from creating noise in the amplifier circuitry. The control cord 2516 connects the reader 2500 to the external computer 2824, entering the shell and passing through strain relief fitting 2916 for connecting to the PCB 2902 with electrical connector 2918.

The optical system 2806 may be mounted to the front end of the PCB 2902 and further secured to the lower shell 2704 with locating pins 2920 and/or clips 2922 as needed. The radiant energy source 2802 is typically mounted to the PCB 2902 and electrically connected thereto to receive electrical power. The radiant energy source 2802 produces light or other radiant energy which is delivered into the optical system 2806. In one embodiment, the radiant energy source 2802 is a light emitting diode (LED), however it will be apparent that a laser or other radiant energy source could be used. The optical system 2806 comprises a projection portion 2924 for directing the radiant energy along a projection path extending from the radiant energy source 2802 to the target region 2926. The optical system 2806 further includes a collection portion 2928 for collecting the radiant energy reflected from a symbol (e.g., a bar code) when the symbol occupies the target region 2926 and directing the collected radiant energy along a collection path extending from the target region to the photodetector 2816. The collection path of the optical system 2608 is typically enclosed by a light shield 2930 to prevent unwanted radiant energy from entering the optical system and being reflected or scattered into the photodetector 2816.

Figure 30:
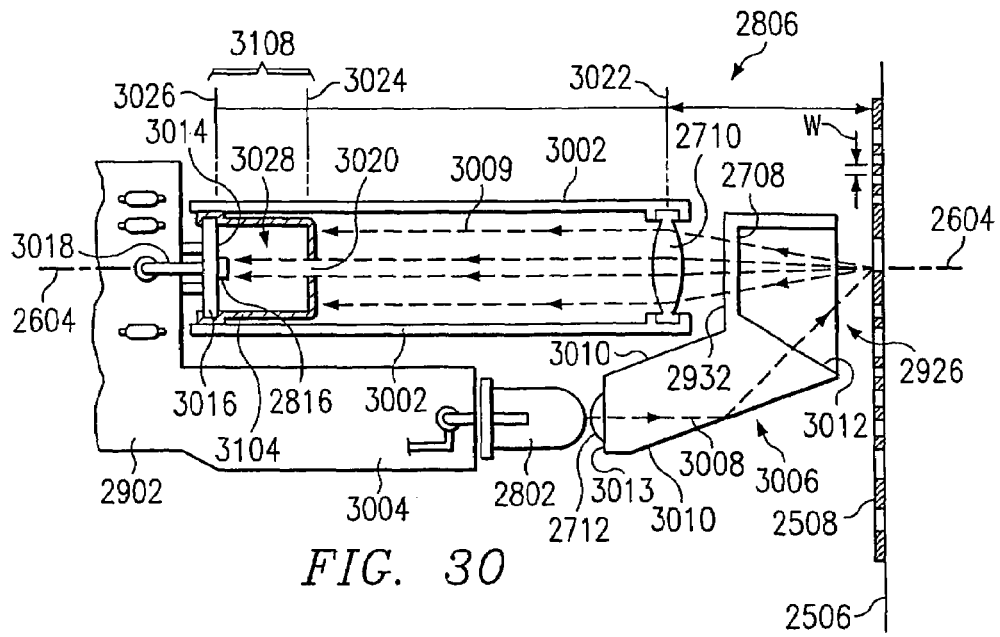
FIG. 30 illustrates an enlarged view of the optical system of the optical reader while reading a bar code.

Referring now to FIG. 30, there is illustrated an enlarged view of the optical system 2608 showing its constituent components. In FIG. 30, the top of the light shield 2930 has been removed for clarity of illustration, but the walls 3002 of the light shield are present on either side of the collection axis 2604. In this embodiment, the radiant energy source 2802 is mounted on a forward extension 3004 of the PCB 2902. At least a portion of the radiant energy emitted by the source 2802, which is typically visible—or IR—wavelength light, enters the projection portion 2924 of the optical system. In the embodiment shown, the projection portion includes a guideway 3006 which directs the radiant energy (denoted by rays 3008) from the source 2802 to the target region 2926. In one embodiment, the guideway 3006 comprises a transparent prism which directs the radiant energy 3008 by reflection from the guideway sides 3010 and by refraction at the guideway ends 3012, 3013. It will be apparent, however that other embodiments may utilize a mirror or fiber optics as the guideway 3006. Alternatively, other embodiments may directly illuminate the target region 2926 from the source 2802 without the use of a guideway. A guideway lens 2712 may be used at the upstream end 3013 of the guideway 3006 to increase the amount of radiant energy collected from the source 2802 for delivery to the target region 2926.

The radiant energy 3008 delivered to the target region 2926 illuminates any bar code 2508 present, causing the energy to be scattered from the surface of the bar code as illustrated. At least a portion of the energy scattered from the bar code 2508 is reflected into the collection lens 2710, forming a reflected image of the bar code. This image is directed along the collection axis 2604 of the optical system downstream toward the photodetector 2816. As the bar code 2508 moves through the target region 2926, the reflected image of the alternating light and dark (i.e., more reflective and less reflective) bars forming the symbol will be directed across the photodetector 2816, causing the output electrical signals to vary correspondingly. Given output electronic signals having sufficient signal-to-noise ratio, decoding circuits of known design can amplify and decode the output electrical signals from a photodetector and identify the corresponding bar code. However, prior to the current invention, photodetectors providing signals having sufficient signal-to-noise ratio were not available at a sufficiently low manufacturing cost. Of particular challenge is obtaining a high signal-to-noise ratio electrical signal from a photodetector without utilizing a multi-stage photo amplifier. Further, it is preferred that the system utilize as few optical elements as possible.

Referring still to FIG. 30, the photodetector 2816 of the current embodiment is mounted on the top surface 3014 of a base 3016 and electrically connected to the PCB 2902 with leads 3018. The photodetector 2816 may be a device selected from the group of known light-sensitive devices including photo-diodes, photo-transistors, photo-resistors, photomultiplier tubes, and Charge Coupled Devices (CCD). Alternately, the photodetector 2816 may be another type of device for producing electrical signals corresponding to light incident thereupon. In a preferred embodiment, the photodetector 2816 is a photo-diode which provides a desirable combination of light-sensitivity and low cost.

Disposed upstream on the collection path from the photodetector 2816 is a pinhole aperture 3020. Preferably, there are no intervening or refractive or diffractive elements between the pinhole aperture 3020 and the photodetector 2816, as their presence will increase the cost of the device. A pinhole aperture is a well known optical element which provides a well defined, virtually undistorted image of objects across a wide angular field (i.e., good depth of focus) and over a large range of distances (i.e., good depth of field). A pinhole aperture does not focus the energy passing therethrough, but rather increases the contrast of the image, although at the same time decreasing its luminance. Raising the contrast of the image passed to the photodetector 2816 increases the signal-to-noise ratio of the resulting electrical output. The lower luminance of the image merely reduces the overall output signal strength and can be easily overcome by electronic amplification if the signal-to-noise ratio of the signal is high. Thus, by positioning the pinhole aperture 3020 upstream of the photodetector 2816 in the current invention, the image contrast of the bar code image is increased such that an inexpensive single stage photodetector can provide an electrical signal having sufficient signal-to-noise ratio to allow decoding of the bar code without encountering excessive signal noise during electronic amplification.

The collection lens 2710 is disposed upstream on the collection path (i.e., toward the bar code which is the source of the image) from the pinhole aperture 3020. Preferably, collection lens 2710 is a magnifying lens, i.e., refracting the light rays passing therethrough to create an image which has increased dimensions compared to the actual bar code. The magnifying lens illustrated in FIG. 30 is a single element double convex lens. In another embodiment, a single element plano-convex lens may be used. In still further embodiments, other single element or multi element magnifying lenses can be used for collection lens 2710. Preferably, there are no intervening refractive or diffractive elements between the pinhole aperture 3020 and the collection lens 2710, as their presence will increase the cost of the device.

The refracted light rays 3009 leaving the collection lens 2710 form an image of the bar code which is dimensionally magnified as it moves toward the pinhole aperture 3020, thereby increasing the apparent width of the bars when their image is received at the pinhole aperture. The portion of the image passing through the pinhole aperture 3020 and reaching the photodetector 2816 will likewise be dimensionally magnified. Thus, the optical system 2806 of the current embodiment, combining dimensional image magnification (provided by the collection lens 2710) and contrast enhancement (provided by the pinhole aperture 3020) effectively acts to pre-amplify the optical signal reaching the photodetector 2816 such that the electrical output signals 2818 will have sufficient signal-to-noise ratio for amplification and decoding without requiring a multi stage electronic photo amplifier which would be more expensive to manufacture. Described another way, the optical system according to one embodiment of the current invention provides increased resolution (i.e., the ability to distinguish between two lines or points in a symbol) as follows: The bar code 2508 to be read has a minimum unit width denoted by W, for example, the minimum width of a bar in the bar code. The light rays 3009 of the image are refracted by the collection lens 2710 such that the minimum unit width of the bar code is dimensionally magnified, for example, from W to 2×W (i.e., a factor of 2×) as it moves from the target plane 2506 to the pinhole aperture plane 3024.

The pinhole aperture 3020 is selected to have a diameter, for example 0.5×W, which is smaller than the magnified minimum unit width. Thus, only a sample (denoted by reference numeral 3028) of the image rays may pass through the aperture 3020 to the photodetector 2816 lying in the photodetector plane 3026. This results in the photodetector 2816 seeing (i.e., having in its field of view), at most, either a portion of a single feature (bar or space) or portions of one bar and one adjacent space. The photodetector never sees portions of three adjacent features at the same time. This arrangement results in a very high signal-to-noise ratio being produced by the photodetector 2816. In one embodiment of the current invention, the optical system 2806 provides at the photodetector plane 3026 an image of the symbol 2508 at the target plane 2506 which is dimensionally magnified within the range of about 0.5× to about 5×. In another embodiment, the optical system 2806 provides at the photodetector plane an image of the symbol at the target plane which is magnified within the range of about 1.5× to about 2.5×. In yet another embodiment, the optical system 2806 provides at the photodetector plane an image of the symbol at the target plane which is dimensionally magnified within the range of 1.9× to about 2.1×.

Referring still to FIG. 30, a protective window 2708 may be provided along the collection path upstream from the magnifying lens 2710. The protective window 2708 has parallel surfaces which are disposed substantially perpendicular to the collection path 2604 and thus do not substantially refract or diffract light rays passing therethrough. In the embodiment illustrated, the protective window 2708 is molded as an integral portion of the component which also comprises the projection guideway 3006 and guideway lens 2712. In one embodiment of the current invention, the collection portion 2928 of the optical system 2806 consists of only the protective window 2708, the magnifying collection lens 2710 and the pinhole aperture 3020 arranged in that order between the target symbol 2508 and the photodetector 2816. Such an embodiment provides a functional optical system having very low production costs.

Figure 31:
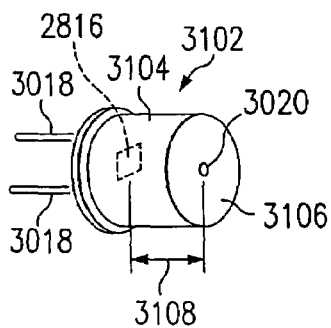
FIG. 31 illustrates a perspective view of the detector unit used in an embodiment of the optical reader.
Figure 32:
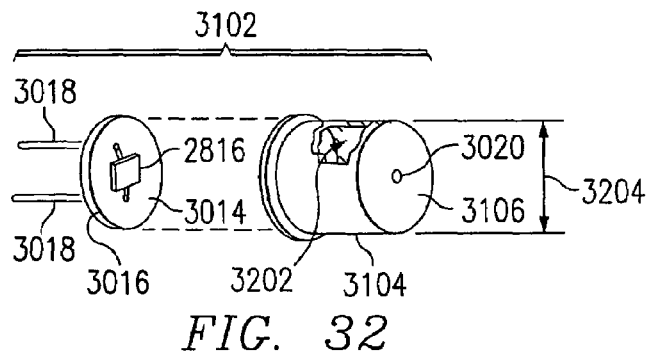
FIG. 32 illustrates an exploded view of the detector unit of FIG. 31.

Referring now to FIGS. 31 and 32, there is illustrated a discrete detector unit 3102 which may be used in an embodiment of the invention. The detector unit 3102 comprises the photodetector 2816 and the pinhole aperture 3020 packaged together in a discrete unit. Such packaging decreases production costs by reducing the assembly's part count and by reducing the number of components which must be assembled.

As best seen in FIG. 32, the detector unit 3102 includes a base 3016 having a top surface 3014 upon which the actual photodetector 2816 is mounted. Note that the photodetector 2816 may be a separate electronic component which has been mounted to the base 3016 or alternately, it may be a device formed as an integral part of the base substrate. A cap 3104 is mounted to the base 3016. The cap 3104 has a top portion 3106 which is spaced apart from the top surface 3014 of the base 3016 to define an interior cavity 3202 containing the photodetector 2816. The cap 3104 has a single pinhole 3020 formed therethrough at a predetermined distance 3108 from the photodetector 2816. Except for the pinhole aperture 3020, the cap 3104 is preferably light-tight.

In one embodiment of the invention, the cap 3014 of the detector unit 3102 is a cylindrical metallic canister having a flat upper portion 3106. Using a metallic canister for the cap 3014 has two advantages: first, it provides a rugged container which protects the photodetector from damage during transportation, handling and assembly; and second, the metallic material allows a pinhole aperture 3020 having high dimensional accuracy to be formed by drilling, punching or otherwise machining a hole through the metallic surface. In addition, cylindrical metallic canisters suitable for use as cap 3014 are readily available at very low costs in the electronic industry, having been used for many years as protective caps for transistors and other semiconductor devices. To provide for a convenient sized optical reader, one embodiment of the current invention utilizes a detector unit 3102 having a cap 3104 with a diameter 3204 within the range of about 3 millimeters to about 20 millimeters. Another embodiment of the current invention utilizes a detector unit 3102 having a cap 3104 with a diameter 3204 within the range of about 4 millimeters to about 8 millimeters. Yet another reader according to the current invention utilizes a cap for the detector unit 3102 having a diameter 3204 within the range of about 5.5 millimeters to about 6.5 millimeters.

The predetermined distance 3108 between the pinhole aperture plane 3024 and the photodetector plane 3026 will affect the overall magnification of the image (or portion of the image) received at the photodetector 2816. In one embodiment of the current invention, the predetermined distance 3108 is within the range of about 1 millimeter to about 10 millimeters. In another embodiment of the current invention, the predetermined distance 3108 is within the range of about 3 millimeters to about 7 millimeters. In yet another embodiment, the predetermined distance 3108 between the photodetector 2816 and the pinhole aperture 3020 is within the range of about 4.5 millimeters to about 6 millimeters.

Figure 33:
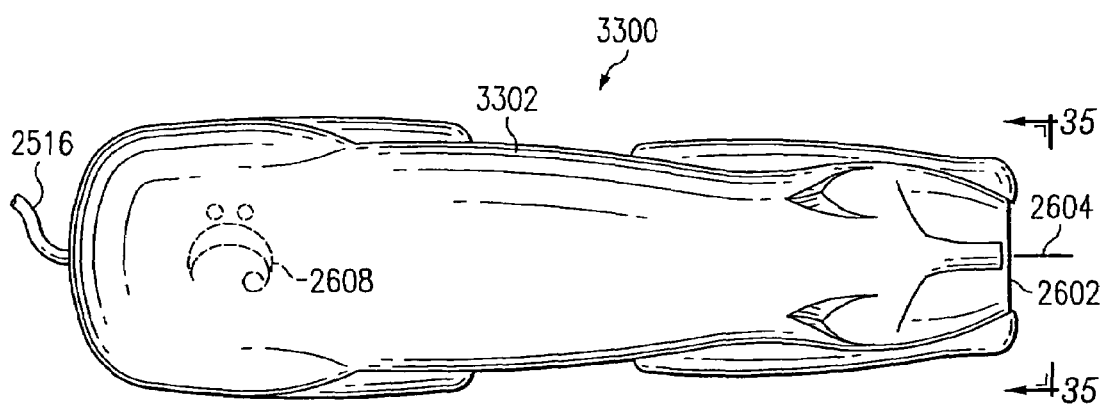
FIG. 33 illustrates a top plan view of an optical reader according to another embodiment of the invention.
Figure 34:
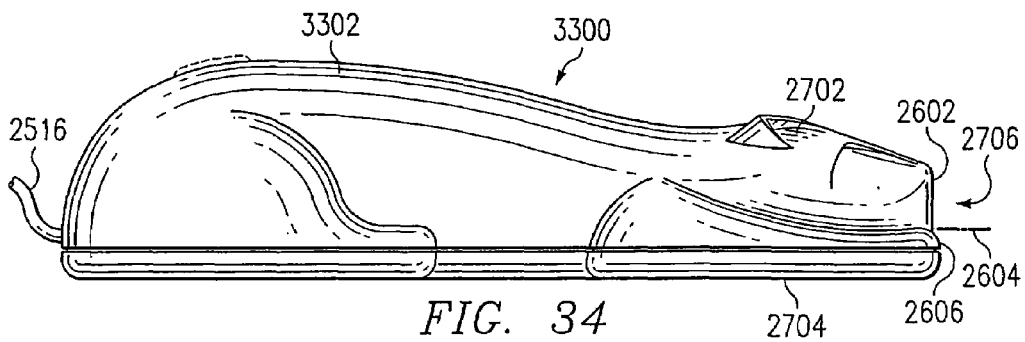
FIG. 34 illustrates a side elevation view of the optical reader of FIG. 33.
Figure 35:
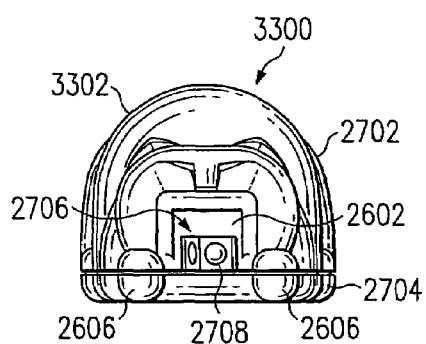
FIG. 35 illustrates a front elevation view of the optical reader viewed from line 35-35 of FIG. 33.

Referring now to FIGS. 33-35, there is illustrated an alternative embodiment of the invention. Optical reader 3300 has an exterior shell 3302 contoured to resemble an animal, in this case, a stylized cat. It will be readily appreciated that, except for the recontoured shell 3302, the features described for the previous embodiment are present in substantially identical form in this embodiment, including the scanning portal 2706, window 2708, bearing surface 2602 and pads 2606. In addition, identifying or advertising indicia 2608 may be placed on the stylized shell of reader 3300 in the same fashion as on the previous embodiment. It will further be apparent that the external shell of the reader can be contoured to resemble other animals, e.g., dogs, birds, reptiles, fish, etc. or other objects including automobiles, trucks, trains, aircraft, etc. without departing from the scope of the current invention.

Figure 36:
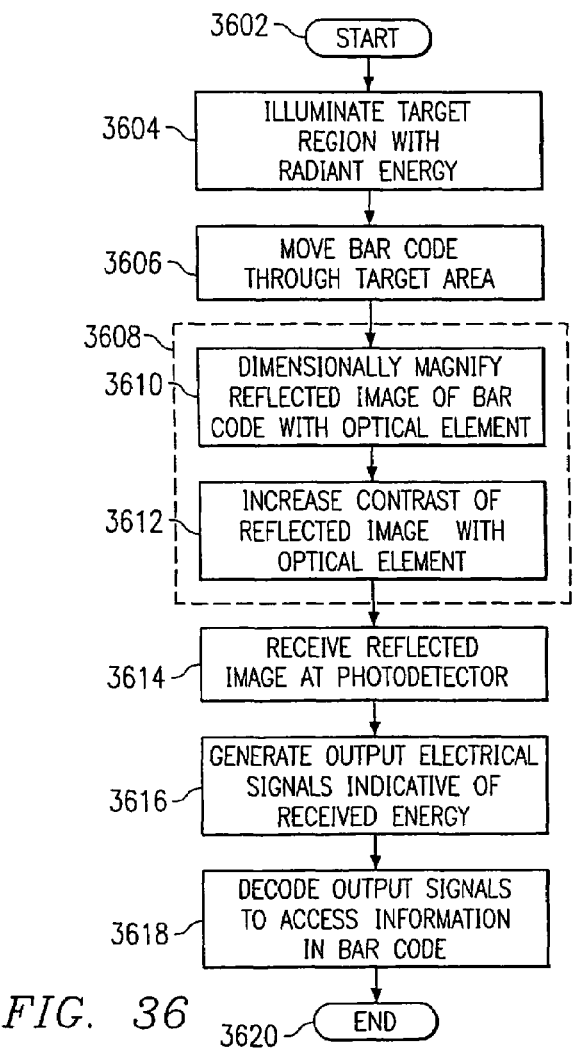
FIG. 36 illustrates a flowchart of one embodiment of the process for reading a bar code.

Referring now to FIG. 36, there is illustrated a flowchart of a method of reading a bar code in accordance with another aspect of the current invention. The method starts in block 3602 and proceeds to the first function block 3604 wherein the target region is illuminated with a radiant energy generated by a radiant energy source which is directed from the source to the target region. Next, flow continues to function block 3606 wherein the bar code or other symbol is moved through the target area. Flow next proceeds to block 3608 which represents transmitting an image of the illuminated bar code through an optical system along a collection path extending from the target region to a photodetector. The step of transmitting includes a first sub-step 3610 wherein the reflected image of the bar code is dimensionally magnified with an optical element which is disposed along the collection path between the target region and the photodetector. Preferably, the optical element used for dimensional magnification is a magnifying lens, either a double convex lens or a plano-convex lens. Further, it should be noted that sub-step 3610 is preferred but not required.

The step 3608 of transmitting an image of the illuminated bar code further comprises a second sub-step 3612 which is increasing the contrast of the reflected image and decreasing the luminance of the image by passing it through an optical element disposed along the collection path between the target region and the photodetector. Note that when sub-step 3610 is performed, the optical element for magnifying the image is disposed between the bar code and the optical element which increases the contrast of the reflected image. In an embodiment of the invention, the optical element which increases the contrast of the reflected image is a passive device, i.e., it requires no electrical energy or other external power. In another embodiment, the optical element which increases the contrast of the image is combined in a discrete package with the photodetector. In yet embodiment, the optical element which increases the contrast of the reflected image is a pinhole aperture. The pinhole aperture may be formed through the body of a discrete package enclosing the photodetector or the pinhole aperture may be a separate element included in the optical system.

Flow now continues to function block 3614 wherein the reflected image of the bar code is received by the photodetector. Flow then continues to function block 3616 wherein the photodetector generates output electrical signals indicative of the radiant energy received. Flow then proceeds to function block 3618 wherein the output electrical signals produced by the detector are decoded to provide an indication of the information contained in the bar code. The method of reading the bar code is now complete as indicated by the flow proceeding to the "End" block 3620.

Portable Wireless Scanner

Figure 37:
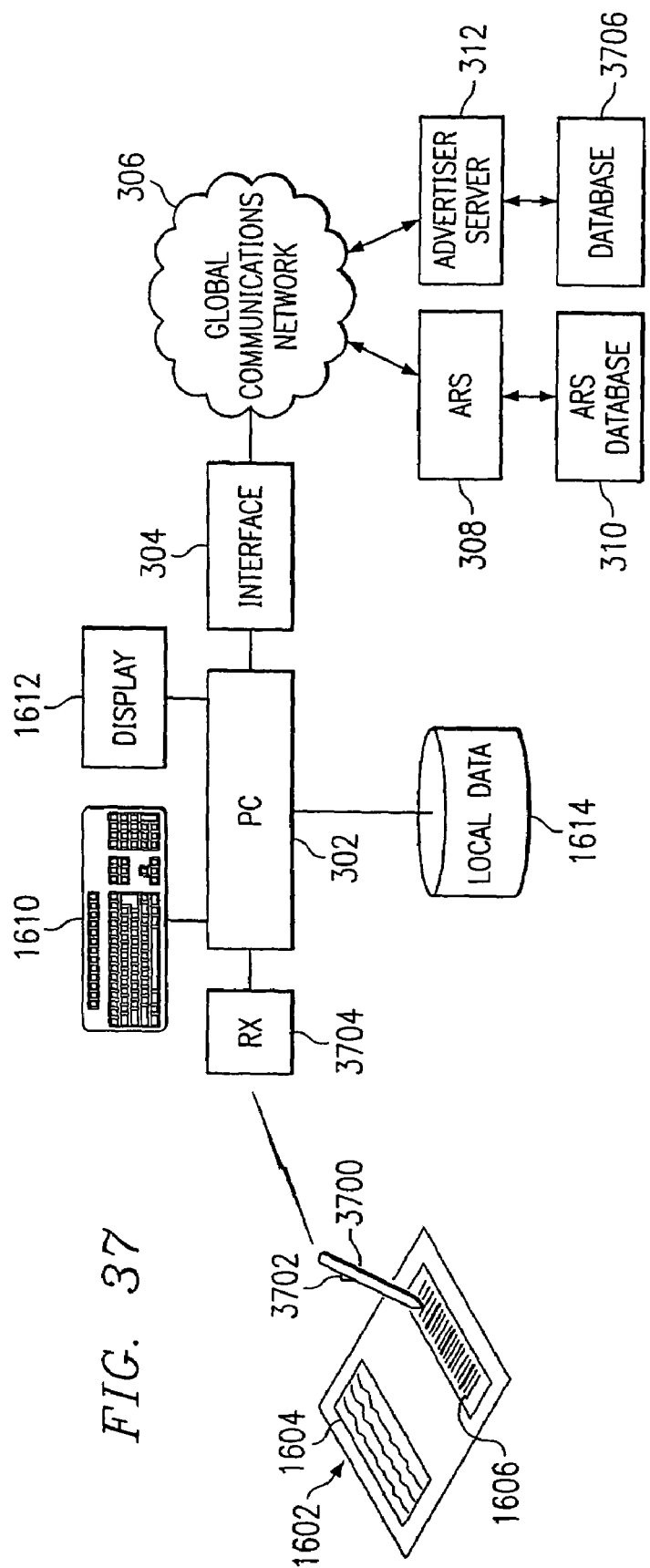
FIG. 37 illustrates a system diagram of a disclosed embodiment using the wireless scanner.

Referring now to FIG. 37, there is illustrated an embodiment using the wireless portable scanner as the input device. In general, the portable scanner 3700 is operable to scan one or more MRCs 1606, and store corresponding MRC data in an onboard memory. The user is then free to download the MRC data to a computer at a later time, or to have the information corresponding to the MRC data retrieved substantially immediately at the time the user is scanning the related MRC 1606. These features are described in greater detail hereinbelow. The scanner 3700 is wireless in that any data downloaded from the scanner 3700 is transmitted to the computer via a wireless link. The wireless communication link can be a radio frequency (RF) link, an infrared link, or other conventional communication protocols. The computer would then have the corresponding communication architecture to facilitate reception of the signals transmitted from the scanner 3700. The stored MRC data can be downloaded one at a time at the discretion of the user so that the user can view each corresponding web information at his or her own speed, the MRC data can be loaded substantially immediately after the MRC has been scanned (in an automatic mode) with the user pressing the transmit button, or all of the stored MRC data can be downloaded as a batch in response to the user, for example, holding a transmit button down beyond a specified amount of time (e.g., three seconds) to initiate the batch mode download. The user can then review all of the downloaded MRC data at a later time.

The user, upon obtaining the wireless portable scanner 3700, may be required to register certain personal information to the provider of the scanner 3700, including, for example, name, address, credit account information (e.g., credit card and/or bank account), etc. The scanner 3700 has associated therewith and stored therein a unique scanner ID which uniquely identifies the scanner 3700 with the owner and personal information provided therefor. This personal information is stored at the ARS 308 disposed on the GCN 306.

In operation, the user has a document 1602 with text 1604 which describes a particular product or information the user desires to view on the display 1612 of the PC 302. (Notably, the user ID information may be stored in the PC 302 as a unique user ID, as described hereinabove, and the user information.) The user then scans the MRC 1606 with the scanner 3700 causing the MRC data to be stored therein in a memory of the scanner 3700. The scanner 3700 is operable to store several MRCs 1606 limited only by the amount of memory contained with the scanner 3700.

When the user has finished storing selected MRC 1606, the user can then press a transmit button 3702 to transmit the stored MRC data and unique scanner ID information to the PC 302, the PC 302 having a receiver 3704 attached thereto to accommodate the signal transmitted from the scanner 3700. Upon receipt of the information from the scanner 3700, PC 302 extracts the scanner ID and MRC data therefrom, and assembles a message packet having appended routing information, which appended routing information is a network address of the ARS 308. This information is then transmitted through the network interface 304 across the GCN 306 to the ARS 308, where a lookup operation is performed to obtain matching information from the ARS database 310. Using the scanner ID and the MRC data, a network URL address is returned that is associated with the particular MRC data such that the network address is returned to the address corresponding to the registered scanner 3700 location, which is the location of the user of the scanner 3700, to pass the information to the PC 302. The PC 302 then takes the network address information of the advertiser or vendor associated with the MRC 1606 and connects the PC 302 to the advertiser server 312 which then presents the corresponding product information associated with the MRC 1606 to the user via display 1612 connected to the PC 302.

The advertiser server 312 has associated therewith a database 3706 which contains a variety of product information corresponding to the particular network URL address contained in the ARS database 310. Similarly, if the user scans a second MRC (not shown) which is different from the first MRC 1606, that second MRC may be associated with a second advertiser such that the information returned from the ARS database 310 points to a second advertiser server (not illustrated) disposed on the GCN 306 causing the second advertiser server to return the corresponding information for display to the user on display 1612. As mentioned hereinabove, the scanner 3700 contains a memory allowing the user to store one or more MRCs 1606 up to the limits of the memory. Any PC 302 associated with the disclosed architecture having the receiver 3704 and the ARS 308 can then transmit the stored information of the scanner 3700 to retrieve the corresponding web page information. The keyboard 1610 is connected to the PC 302 to allow manual entry of any MRC information at the discretion of the user.

Figure 38:
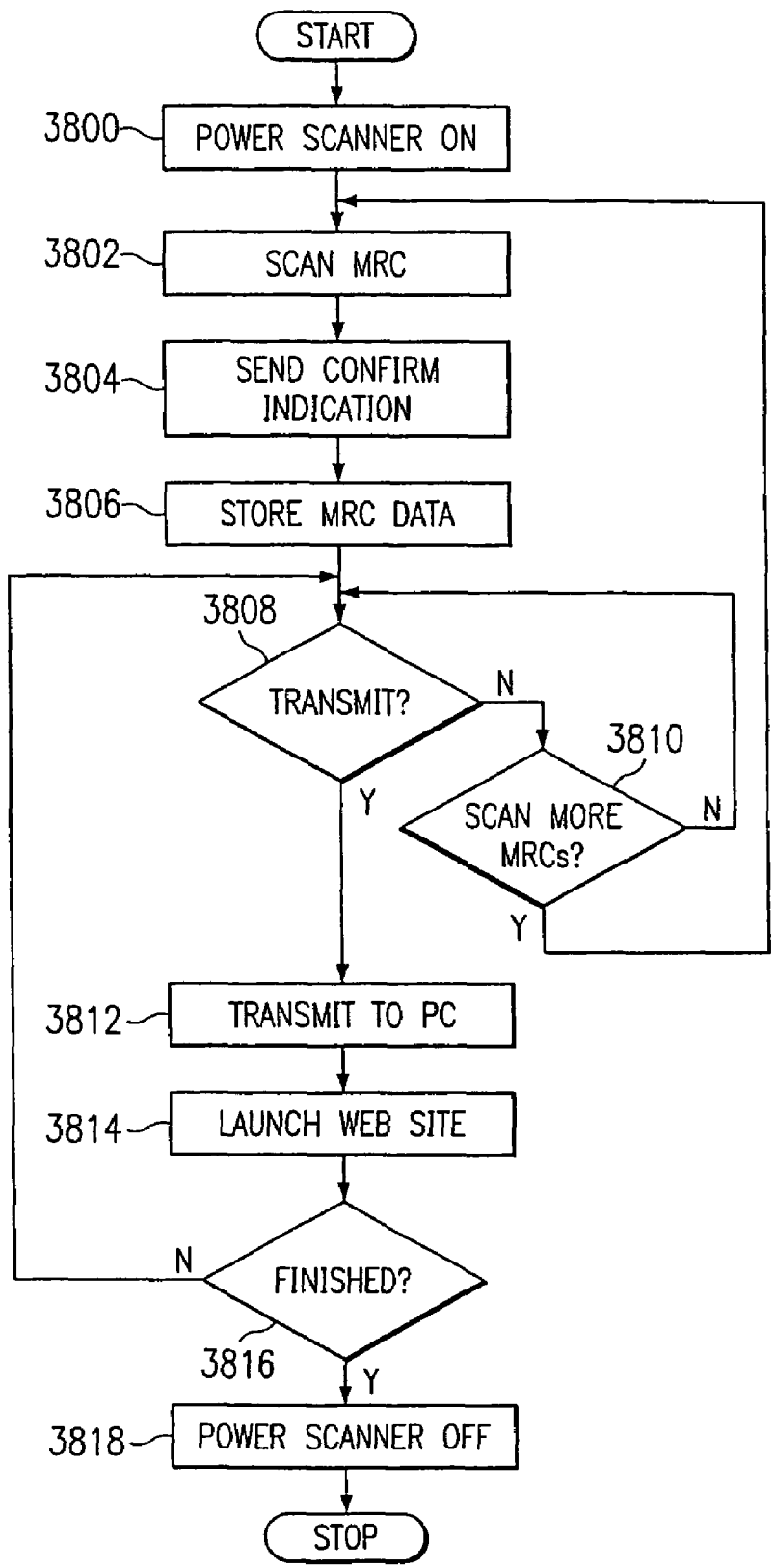
FIG. 38 illustrates a flowchart for the process of launching a web site using the wireless scanner.

Referring now to FIG. 38, there is illustrated a flowchart of a disclosed embodiment. Flow begins at a Start point and moves to a function block 3800 where the user powers the scanner 3700. Flow is then to a function block 3802 where the user scans an MRC 1606 using the scanner 3700. Flow is then to a function block 3806 where a confirmation indication is provided to the user of the scanner 3700 in response to the user performing a successful scan of the particular MRC 1606. This indication may be in the form of an audio signal or an LED indicator provided on the scanner 3700. In another embodiment, the user merely views the display of PC 302 to see that a successful scan has been completed. This will be described hereinbelow. The scanned MRC data is then stored in the memory of the scanner 3700, as indicated in function block 3806. Flow is then to a decision block 3808 where a determination is made as to whether the user has enabled transmission of the stored MRC data and scanner ID. If not, flow is out the "N" path to another decision block 3810 to determine if the user wants to scan more MRCs. If not, flow is out the "N" path back to the input of decision block 3808 where the user can then transmit the stored data.

On the other hand, if the user has decided to transmit the stored MRC data, flow is out the "Y" path of decision block 3808 to a function block 3812 where the user presses the trigger button 3702 to trigger transmission of the stored information to the PC 302. Flow is then to a function block 3814 where a number of events occur. The PC 302 assembles a message packet containing the scanner ID and one or more MRCs 1606 and appended routing information pointing to the location of the ARS 308 disposed on the GCN 306. The message packet is then transmitted to the ARS 308 and decoded to obtain the scanner ID and MRC data. The lookup operation is performed on the ARS database 310 such that the network URL address of respective MRC data is returned back to the PC 302. The PC 302 then connects to the advertiser server 312 in accordance with the returned advertiser network address. The corresponding product data of the MRC is then returned from the advertiser server 312 via the GCN 306 for presentation using display 1612 to the user. Notably, the product information corresponding to the MRC data could be in the form of audio information, which audio information would then be returned to the PC 302 for presentation to the user via a multimedia audio system of the PC 302.

Display of the respective MRC web page data can occur as the user simply scrolls through selections stored within the wireless scanner 3700 by pressing a feature button allowing the user to step through the stored MRC data information. Alternatively, after completion of the transmitted data to the PC 302, the PC 302 can be configured to step through the returned product web page information in a fashion which allows the user to comfortably view the information before moving on to a subsequent web page of another MRC. Further, the PC 302 can be configured to provide user interaction with the returned MRC product information data such that the user can selectively scroll through the web page information at his or her leisure. Function block 3814 then indicates that the product information web pages are presented to the user on the display 1612. Flow is then to a decision block 3816 where a determination is made as to whether the user has finished viewing the MRC product-related information. If not, flow is out the "N" path back to the input of decision block 3808 to provide the user with the option to transmit again either the total MRC data, or provides the scroll feature where the user can selectively transmit one MRC piece of information at a time and view it accordingly. On the other hand, if the user has finished viewing information, flow is out the "Y" path to a function block 3818 where the user powers the scanner 3700 off, and flow reaches a Stop point.

Referring again to decision block 3810, if the user decides not to transmit, as indicated in decision block 3808, but has more product MRCs to scan, flow is out the "Y" path of decision block 3810 back to the input of function block 3802 where the user scans more MRC data. The user can then continue to scan as many MRCs as the onboard memory of the scanner 3700 allows prior to transmitting the MRC data for presentation of respective web pages.

Figure 39:
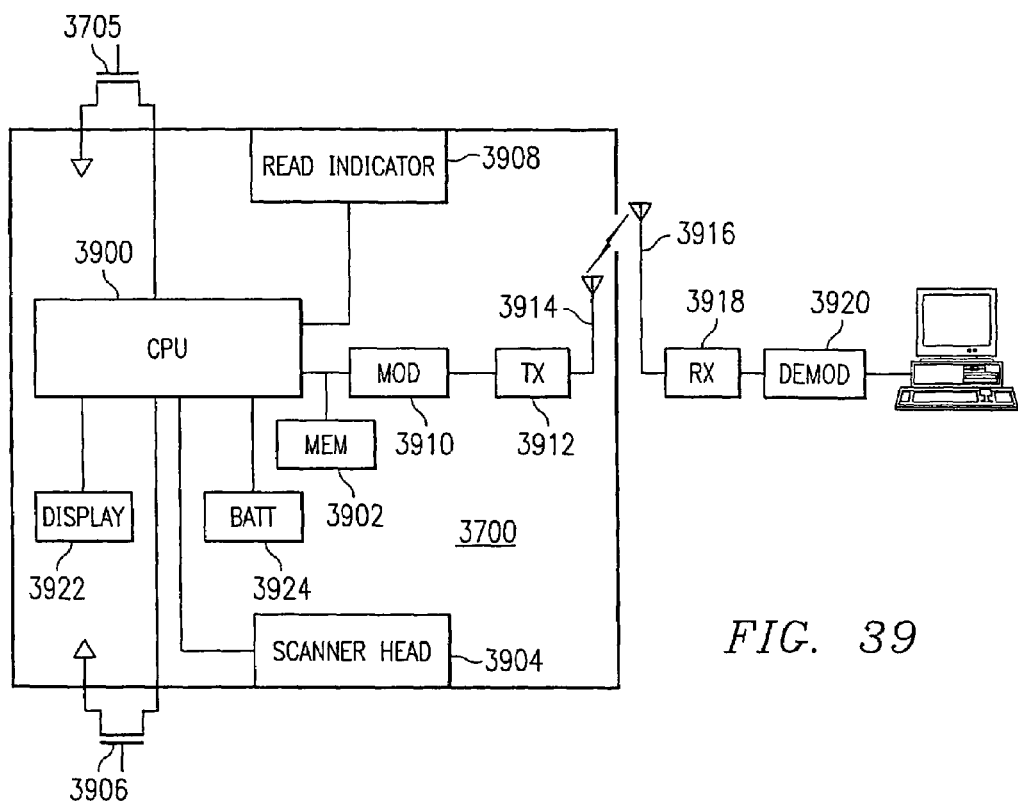
FIG. 39 illustrates a detailed block diagram of the portable scanner in operation with the PC/POS.

Referring now to FIG. 39, there is illustrated a general block diagram of the portable scanner 3700 in operation with the PC 302. This is a general block diagram of the components of the portable scanner 3700 and may contain more or less components to fulfill the desired functions of the scanner 3700. Scanner 3700 incorporates a CPU 3900 for handling all onboard monitoring and control functions of the unit. Attached thereto is a memory 3902 for storing MRCs 1606 which are associated with products and product information. Also connected to the CPU 3900 is the scanner head 3904 which incorporates all the emitter/detector electronics for reading MRC data 1606. A scan enable button 3906 is used to initiate or enable scanning of MRC information into the memory 3902 of the scanner 3700. In response to a successful scan of an MRC 1606, one or more read indicators 3908 are provided which can output, for example, a light, or an audio signal, etc.

After completing the scanning of the MRC 1606, the user then depresses the transmit button 3702 which causes the CPU 3900 to retrieve the MRC data and the scanner ID data stored in the memory 3902, and pass it to a modulator 3910, which modulator 3910 prepares the data for transmission through a receiver 3912 across an antenna 3914 to a receiving antenna 3916 attached to a receiver 3918. The receiver 3918 may be assembled in conjunction with a demodulator 3920 for demodulating the modulated signal received from the scanner 3700. The demodulator 3920 and receiver 3918 also may be in a single unit internal to the PC 302. The display 1612 is provided with the PC 302 to display product or web page information to the user. The scanner 3700 can also include an alphanumeric display 3922 which connects to the CPU 3900 for allowing the user to scroll through scanned MRCs, and if desirable, to selectively delete any MRCs related to products the user no longer wishes to purchase. The display 3922 facilitates selection or deletion of stored MRC data prior to the user downloading the stored MRCs 1606 for presentation to the user. For example, if the user had stored six entries of MRC data, but later decided that entry number 3 was of no value, the display allows the user quick access to that MRC data to select is for deletion. The process of deleting stored MRC data may simply be pressing a combination of buttons, or a series of other user actions to with the scanner 3700 to delete a selection. Similarly, the process of transmitting a selection may automatically delete it from the memory of the scanner 3700. A battery 3924 connects to the CPU 3900 and provides power to all onboard electronics.

Figure 40:
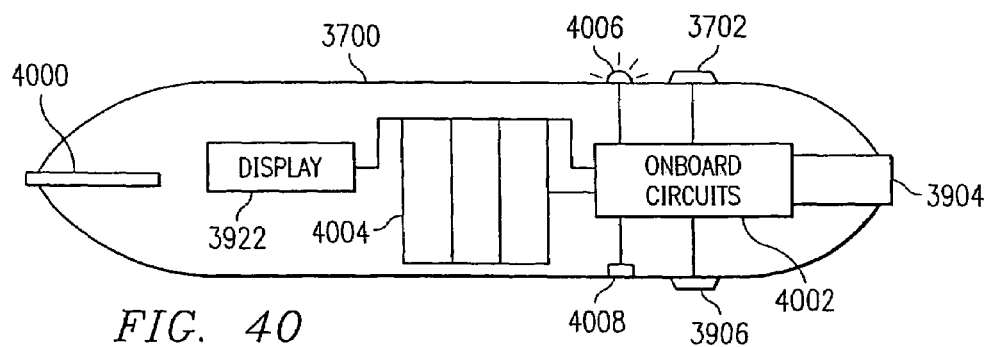
FIG. 40 illustrates a physical diagram of the portable scanner.

Referring now to FIG. 40, there is illustrated a physical diagram of the portable scanner 3700. This particular embodiment of the scanner 3700 is in the shape of a pen. The scanner 3700 comprises a standard writing portion 4000 for use as a writing instrument. Furthermore, the scanner 3700 also comprises a scanner function provided by the scanner head electronics 3904 located at the opposite end of the writing portion 4000. The scanner head 3904 extends partially outside the surface of the scanner 3700 for scanning MRCs 1606. Also contained within the scanner 3700 are onboard circuits 4002 which contain the memory 3902, the CPU 3900, the modulator 3910, transmitter 3912, and antenna 3914. The alphanumeric display 3922 also connects to the onboard circuits to display information corresponding to the MRCs. The onboard circuits 4002 interface to a battery structure 4004 (similar to battery 3924) which provides onboard power for portable use of the scanner 3700. Attached to the onboard circuits 4002 are the read indicators 3908 which comprise, for example, an LED 4006 and/or a speaker 4008 for providing some confirmation that the MRC 1606 has been properly scanned. Also connected to the onboard circuit 4002 is the scan enable button 3906, and the data transmit button 3702 for enabling transmission of the stored MRC and scanner ID information to the PC 302.

Referring now to FIG. 41, there is illustrated a basic data signal sent from the scanner 3700 to the PC 302. The MRC data can be automatically transmitted without user intervention (i.e., pressing the trigger button 3702) such that MRC data is transmitted in regular intervals. The illustrated signal indicates that $MRC_1$ is being transmitted three times, followed by $MRC_2$, etc. Similarly, were the user to transmit the MRC data by pressing the trigger button 3702, the MRC data could also be sent in triplicate in response to a single trigger. Other transmission schemes can be incorporated to meet the requirements of a particular environment, for example, the MRC data may only need to be sent in duplicate, or four times, etc. As will be described hereinbelow, this is for the purpose of ensuring that the MRC is delivered and received by the PC 302 accounting for interference problems inherent to wireless systems.

Referring now to FIG. 42, there is illustrated a flowchart of the signal interrogation process by the PC 302. The PC 302 is operable to continuously monitor for a transmitted signal from the scanner 3700. Therefore, flow is first to a decision block 4200 to monitor any incoming transmissions. If no transmissions are received, flow is out the "N" path back to the input of the decision block 4200. If a transmission is received, flow is out the "Y" path to another decision block 4202 to determine if the received MRC information is a duplicate of an already-received MRC indicating a retransmission. If so, flow is out the "Y" path to a function block 4204 where the duplicate data is discarded. On the other hand, if the MRC data is not a duplicate of the preceding MRC data, flow is out the "N" path to a function block 4206 where the new data is buffered temporarily prior to processing, as indicated in a function block 4208. When finished processing that particular MRC data, flow loops back to the input of the decision block 4200 to continue monitoring for transmissions from the scanner 3700.

Referring now to FIG. 43, there is illustrated a flowchart of the MRC data processing from the perspective of the user. Flow begins at a function block 4300 where the user scans the MRC 1606. Flow is then to a function block 4302 where the PC 302 retrieves the product information corresponding to the scanned MRC data according to disclosed embodiments. Flow is then to a decision block 4304 to determine of the displayed information is that which the user wishes to view. If not, flow is out the "N" path back to the input of the function block 4300 to continue the scanning of another MRC 1606. If so, flow is out the "Y" path to a function block 4306 where the user simply views the information for as long as he or she desires. Flow continues on to another decision block 4308 where the user decides to view more MRC-related information. If so, flow is out the "Y" path to the input of the function block 4300 to scan more MRCs 1606. If not, flow is out the "N" path where the user ceases scanning anymore MRCs 1606, and the process reaches an End point.

In operation, the user will hold the pen scanner 3700 and will utilize the associated scanning mechanism to scan the MRC 1606. When the user scans the MRC 1606, the user will view the display 1612 and expect the display 1612 to "jump" to the appropriate web site (i.e., a change in information currently being viewed on the display 1612). This operation involves, transparent to the user, the launching of the web browser associated with the PC 302 in addition to interpreting the MRC 1606 (which may be a bar code) and determining the routing information therefrom to connect to the appropriate web site. However, the only feedback the user will get is that associated with the jumping in accordance with the routing information associated with the PC 302. In order to facilitate this communication operation utilizing a wireless link, there must be some type of mechanism in place to ensure that the MRC 1606 has been delivered to the PC 302. This is facilitated by utilizing the transmission of multiple codes. This requires the scanner 3700 to store the code and then transmit the MRC code a number of times. The PC 302 and the associated underlying program can interpret this by only accessing the web site based upon the first received code.

Of course, the scanner 3700 could be utilized in a manner where the code was immediately transmitted upon scanning. The primary feedback that the user is provided is that associated with the display jumping to the appropriate web site.

The user will scan the code and look at the web site and, if it does not jump to the web site (as usually perceived by the user), the user will scan the MRC 1606 again. Audible feedback is very typical with scanners that have audible alerts associated therewith. This audible alert indicates that the scan was complete. This is facilitated on the present scanner 3700 utilizing the audible transducer 4008. This visual feedback of the display jumping to the web site completes the operation of scanning, wirelessly transmitting, and viewing the desired information.

Referring now to FIG. 44, there is illustrated a database structure in accordance with a disclosed embodiment. The database, whether located local to the PC 302 in the local data storage 1614 or at the ARS database 310, includes a unique scanner ID 4400 which is associated with scanner 3700 and personal information of the user when the user registered the portable wireless scanner 3700. The database also includes the MRC data and associated URL network address to the advertiser server 312, which URL network address is the direct path information to the corresponding information of the MRC data obtained from the scanning process.

It can be appreciated that the scanner 3700 can be made operable to work only in conjunction with the PC 302 of the user. The PC 302 can be a laptop, a desktop, or server-type computer having the necessary interfaces to accommodate the disclosed scanner 3700. This can be accomplished by providing an interlock mechanism where any attempted download of stored unique codes from the scanner 3700 results in a preliminary interrogation procedure with software on the PC 302 such that a successful interrogation allows operation of the scanner 3700 according to the disclosed embodiments. Unsuccessful interrogation results in a message being returned to the user in the form of viewable text on the display 1612, or audible signals and/or light indicators from the scanner 3700 itself which informs the user that the scanner 3700 will not work with the particular PC 302.

Where the scanner has been reported lost or stolen, additional features can be implemented such that a party who is not the owner of the scanner 3700, but who attempts to use it after such a report has been made, the network address of the PC 302 with which the attempted use is made can be reported to the ARS 308. In response, the ARS 308 can then record the network address and report it to an administrator such that the party can be located, and the lost or stolen scanner 3700 retrieved. Therefore, the personal information obtained at registration of the scanner 3700 could include, in the database, the node address of the PC 302 of the user who initially registered the scanner 3700.

Although the preferred embodiment has been described in detail, it should be understood that various changes, substitutions and alterations can be made therein without departing from the spirit and scope of the invention as defined by the appended claims.

What is claimed is:

1. A method for a user accessing information on a network, comprising the steps of:

extracting with a portable extraction device at a user location information from a machine recognizable code (MRC), which MRC has associated therewith routing information corresponding to a remote location on the network;

wirelessly transmitting the extracted information from the MRC to a network interface device in response to the step of extracting in a predetermined number of steps;

at the network interface device, receiving the transmitted information and, upon receiving any of the transmitted information, utilizing that received information to connect to the remote location on the network, while substantially ignoring subsequent transfers of extracted information from the portable extraction device;

connecting the user location over the network to the remote location associated with the extracted information from the MRC, and downloading information therefrom; and displaying the downloaded information on a display at the user location, such that when displayed, substantially immediate feedback in the form of the displayed information is provided to the user in response to the step of extracting.

2. The method of claim 1, wherein the network is a global communication network.

3. The method of claim 1, wherein the step of extracting comprises scanning the MRC with a portable scanner, which scanner is a wireless scanner having associated therewith a transmitter.

4. The method of claim 1, wherein the MRC is a UPC associated with an article of commerce.

5. The method of claim 1, wherein the MRC is associated with a product and the remote location on the network is associated with the product.

6. The method of claim 1, wherein the display is disposed in close association with the network interface device.

7. The method of claim 6, wherein the network interface device and the display comprise a personal computer.

8. The method of claim 1, wherein the step of connecting to the remote location and downloading information therefrom comprises:

transmitting the extracted information from the MRC to an intermediate location on the network having a relational database associated therewith, which relational database has contained therein relationships between a plurality of MRCs and routing information on the network;

comparing the received MRC with information in the relational database to determine if a match exists; and if a match exists, accessing the remote location and downloading information therefrom to the display.

9. The method of claim 8, wherein the display and the network interface device are disposed at the user location remote from the remote location on the network and the step of accessing information from the remote location comprises transferring the routing information from the relational database back to the user location, the user location and the network interface device then accessing the remote location and the information therefrom for download therefrom.

10. A system for a user accessing information on a network for utilizing information in a machine recognizable code (MRC) to access such information, which MRC has associated therewith routing information corresponding to a remote location on the network, comprising:

a portable extraction device at a user location for extracting information from an MRC code disposed thereat;

a network interface device to which said extracted information from said MRC is wirelessly transmitted by said portable extraction device in response to being extracted thereby;

wherein said extracted information is transmitted to said network interface device in a predetermined number of steps;

wherein said transmitted information is received at said network interface device and, upon receiving any of said transmitted stored information, said remote location on the network is connected to said network interface device utilizing that received information, while ignoring subsequent transfers of extracted information from said portable extraction device;

wherein said network interface device at said user location connects to said remote location associated with said extracted information from said MRC and downloads information therefrom; and wherein said downloaded information is displayed on a display at said user location, such that when displayed, substantially immediate feedback in the form of the displayed information is provided to the user in response to said MRC being extracted.

11. The system of claim 10, wherein the network is a global communication network.

12. The system of claim 10, wherein the MRC is scanned with a portable scanner, which said scanner is a wireless scanner having associated therewith a transmitter.

13. The system of claim 10, wherein said MRC is a UPC associated with an article of commerce.

14. The system of claim 10, wherein said MRC is associated with a product and said remote location on the network is associated with said product.

15. The system of claim 10, wherein said display is disposed in close association with said network interface device.

16. The system of claim 15, wherein said network interface device and said display comprise a personal computer.

17. The system of claim 10, wherein when said network interface device connects to said remote location and downloads said information therefrom, and wherein:

said information extracted from said MRC is transmitted to an intermediate location on the network having a relational database associated therewith, which said relational database has contained therein relationships between a plurality of said MRCs and routing information on the network; and the received MRC is compared with information in said relational database to determine if a match exists, and if said match exists, said remote location is accessed and said information is downloaded therefrom to said display.

18. The system of claim 17, wherein said display and said network interface device are disposed at said user location remote from said remote location on the network, and information which is accessed from said remote location comprises routing information which is transferred from said relational database back to said user location, said user location and said network interface device then accessing said remote location and said information therefrom for download therefrom.

* * * * *